United States Patent
Harris et al.

(10) Patent No.: US 11,867,301 B2
(45) Date of Patent: *Jan. 9, 2024

(54) MANIFOLD WITH INTEGRATED VALVE

(71) Applicant: Sonny's HFI Holdings, LLC, Wilmington, DE (US)

(72) Inventors: Jaime L. Harris, Rosemount, MN (US); Bryan Flood, Minneapolis, MN (US); Karl J. Fritze, Hastings, MN (US)

(73) Assignee: Sonny's HFI Holdings, LLC, Wilmington, DE (US)

( * ) Notice: Subject to any disclaimer, the term of this patent is extended or adjusted under 35 U.S.C. 154(b) by 52 days.

This patent is subject to a terminal disclaimer.

(21) Appl. No.: 17/373,265

(22) Filed: Jul. 12, 2021

(65) Prior Publication Data

US 2021/0341067 A1 Nov. 4, 2021

Related U.S. Application Data

(63) Continuation of application No. 16/562,859, filed on Sep. 6, 2019, now Pat. No. 11,092,251, which is a continuation of application No. 15/402,509, filed on Jan. 10, 2017, now Pat. No. 10,443,747.

(60) Provisional application No. 62/278,385, filed on Jan. 13, 2016.

(51) Int. Cl.
*F16K 11/22* (2006.01)
*F16K 27/00* (2006.01)
*F15B 13/08* (2006.01)

(52) U.S. Cl.
CPC ............ *F16K 11/22* (2013.01); *F16K 27/003* (2013.01); *F15B 13/0814* (2013.01)

(58) Field of Classification Search
CPC ..... Y10T 137/87861; Y10T 137/87877; Y10T 137/87587; Y10T 137/87619; Y10T 137/87643; Y10T 137/87668; Y10T 137/87764; Y10T 137/87772; Y10T 137/8778; F16K 11/22; F16K 11/24; F16K 27/003; F15B 13/0814
USPC ............... 137/881, 883, 888, 892, 895, 898, 137/869–871
See application file for complete search history.

(56) References Cited

U.S. PATENT DOCUMENTS

| 3,788,344 A | 1/1974 | Dyck |
| 3,918,489 A | 11/1975 | Foster et al. |
| 4,586,531 A * | 5/1986 | Lindell ................ B29C 35/007 137/881 |

(Continued)

*Primary Examiner* — Michael R Reid
(74) *Attorney, Agent, or Firm* — Dorsey & Whitney LLP

(57) ABSTRACT

A manifold for use with a fluid delivery system includes a fluid inlet defining a portion of a common channel, a fluid nozzle outlet, a plunger housing of an integrated valve, a collar of a coupling mechanism, and a mounting structure. The fluid inlet, fluid nozzle outlet, plunger housing, collar and mounting structure of the manifold are integrally-constructed. A manifold assembly for use with a fluid delivery system includes at least a first and a second manifold. Each manifold includes a fluid inlet defining a portion of a common channel, a fluid nozzle outlet, a plunger housing of an integrated valve, and a collar of a coupling mechanism. The fluid inlet, fluid nozzle outlet, plunger housing, and collar are integrally-constructed, and the fluid inlet of the first manifold is received by a portion of a common channel of the second manifold.

15 Claims, 14 Drawing Sheets

(56) References Cited

U.S. PATENT DOCUMENTS

| | | | |
|---|---|---|---|
| 4,874,014 A | 10/1989 | Grant et al. | |
| 5,305,788 A | 4/1994 | Mayeux | |
| 5,996,629 A | 12/1999 | Sato et al. | |
| 6,192,932 B1 * | 2/2001 | Izumo | F16K 11/20 251/63.5 |
| 6,240,953 B1 | 6/2001 | Laughlin et al. | |
| 6,619,321 B2 | 9/2003 | Reid et al. | |
| 6,837,269 B2 | 1/2005 | Reinelt et al. | |
| 6,874,537 B2 * | 4/2005 | Hayashi | F15B 13/0857 137/884 |
| 8,322,367 B2 * | 12/2012 | Harris | F16K 27/003 137/884 |
| 8,678,237 B2 | 3/2014 | Harris et al. | |
| 8,807,158 B2 | 8/2014 | Harris et al. | |
| 10,443,747 B2 * | 10/2019 | Harris | F16K 11/22 |
| 11,092,251 B2 * | 8/2021 | Harris | F16K 11/22 |
| 2005/0022814 A1 | 2/2005 | Manhard | |
| 2014/0042242 A1 | 2/2014 | Fritze et al. | |
| 2017/0198822 A1 | 7/2017 | Harris et al. | |
| 2019/0390784 A1 | 12/2019 | Harris et al. | |

* cited by examiner

MANIFOLD WITH INTEGRATED VALVE

CROSS REFERENCE TO RELATED APPLICATION

This application is a continuation of U.S. patent application Ser. No. 16/562,859, filed Sep. 6, 2019, which is a continuation of U.S. patent application Ser. No. 15/402,509, filed Jan. 10, 2017, and issued Oct. 15, 2019 as U.S. Pat. No. 10,443,747, entitled "MANIFOLD WITH INTEGRATED VALVE," which claims priority to U.S. Provisional Application Ser. No. 62/278,385, filed on Jan. 13, 2016, and entitled "MANIFOLDS WITH INTEGRATED VALVES, MODULAR MANIFOLDS, MANIFOLDS WITH ADAPTABLE EDUCTORS, AND SYSTEMS THEREOF," the entire contents of each of which is herein incorporated by reference in the entirety and for all purposes.

TECHNICAL FIELD

The present disclosure relates to manifolds with integrated valves, modular manifolds, manifolds with adaptable eductors, integrated manifold assemblies, and systems thereof.

BACKGROUND

To distribute various fluids for different purposes, a manifold is typically attached to one or more individual valves in piecewise fashion. The valves are commonly electric solenoid valves or other pilot-type valves attached to the manifold via screws or other mechanical fasteners. The manifold often includes one inlet and several outlets, each outlet controlled by one of the valves. Banks of valves can sometimes be modular in construction such that the manifold is expandable from one valve to many without having to machine a new valve bank. However, the increased assembly time and parts count required to construct modular manifolds mechanically fastened to individual valves results in higher production costs. This type of construction, with multiple parts coupled with the manifold, also increases the likelihood of leaks and degradation.

SUMMARY

In some embodiments, a manifold for use with a fluid delivery system may include a fluid inlet defining a portion of a common channel; a fluid nozzle outlet; a plunger housing of an integrated valve; a collar of a coupling mechanism; and a mounting structure. The fluid inlet, fluid nozzle outlet, plunger housing, collar and mounting structure may be integrally constructed.

In certain implementations and alternatives, the manifold may be configured to be coupled to at least one of a connector inlet, an end cap, or another manifold by a manifold coupling. In such implementations, the manifold coupling may be by a spring clip.

In certain implementations and alternatives, the integrated valve may further include a plunger arm and a plunger seat. In such examples, the integrated valve may be configured to receive pressurized air to cause the plunger arm to open a fluid inlet defined by the plunger seat, and the fluid inlet of the plunger seat may fluidly couple the common channel to the fluid nozzle outlet. The integrated valve may further include a plunger spring and a plunger cap. The plunger spring may be arranged between the plunger cap and the plunger arm and urge the plunger arm to a position where the fluid inlet of the plunger seat is closed.

In certain implementations and alternatives, the coupling mechanism may further include a sleeve and one or more jaws. According to such implementations, the coupling mechanism may be configured to couple to an applicator assembly, an eductor assembly or an adapter.

In some embodiments, a manifold assembly for use with a fluid delivery system may include at least a first and a second manifold. Each manifold may include a fluid inlet defining a portion of a common channel; a fluid nozzle outlet; a plunger housing of an integrated valve; and a collar of a coupling mechanism. The fluid inlet, fluid nozzle outlet, plunger housing, and collar may be integrally-constructed, and the fluid inlet of the first manifold may be received by a portion of a common channel of the second manifold. In certain implementations and alternatives, the first and the second manifolds may be coupled by a manifold coupling including a spring clip.

In some embodiments, a manifold assembly for use with a fluid delivery system may include a common fluid channel including a common fluid inlet at a first end and a common fluid outlet at a second end; a plurality of individual fluid outlets, each of the individual outlets fluidly coupled to the common fluid channel and arranged between the common fluid inlet and the common fluid outlet; a common air channel including an air inlet at a first end and an air outlet at a second end; a corresponding number of plunger housings to the plurality individual fluid outlets, each of the plunger housings fluidly coupled to the common air channel; a coupling mechanism configured for coupling the manifold assembly to an adjacent manifold assembly; and a mounting structure configured for securing the manifold assembly. The common fluid channel, individual fluid outlets, common air channel, plunger housings, coupling mechanism and mounting structure may be integrally-constructed.

In certain implementations and alternatives, the plunger housing may include a plunger arm receiving portion. In such examples, a first portion of the plunger arm receiving portion may be configured to fluidly couple with the common air channel, and a second portion of the plunger arm receiving portion may be configured to fluidly couple with the common fluid channel. The plunger arm receiving portion may be configured to sealingly engage with a plunger including a plunger arm such that air from the common air channel and fluid from the common fluid channel are separated. In such implementations, the distal end of the second portion of the plunger arm receiving portion may be coupled to the common fluid channel.

In certain implementations and alternatives, the plunger arm receiving portion may further include an end cap receiving portion configured to receive an end cap for enclosing a plunger. In some examples, an external face of the plunger housing may be configured to receive a solenoid valve.

In certain implementations and alternatives, the manifold assembly further includes one or more latch member coupling mechanisms, the latch member coupling mechanisms each configured to reversibly couple an eductor to the manifold assembly. In such embodiments, the latch member coupling mechanisms may each include a latch member coupled with a spring, the spring compressible by a user.

In some examples, each of the plurality of fluid outlets may be reversibly sealed by a plunger, the plunger configured to move bi-directionally in response to changes in air pressure within the plunger housings.

DETAILED DESCRIPTION

Provided herein are manifolds for use in fluid delivery systems, and more specifically, manifolds with integrated valves, manifolds with a modular construction, integrated manifold assemblies, and/or manifolds adapted to receive a variety of nozzles and/or eductors. Manifold assemblies described herein may include multiple integrated valves controlled at least in part by the input of pressurized air. An eductor may be attached to each manifold output, allowing concentrated chemicals, gases, or other materials to be mixed with a motive fluid derived from a common fluid channel defined by the manifold assembly. Accurately-diluted fluid mixtures may be emitted through each eductor outlet. By integrating one or more valves within modular manifolds, which may also be integrally formed and fluidly connected, the manifold assemblies disclosed herein may be more resistant to leaks and corrosion than pre-existing fluid delivery systems. In addition to enhanced durability, the manifold assemblies may be cheaper to manufacture. Features from any of the disclosed embodiments may be used in combination with one another, without limitation. In addition, other features and advantages of the present disclosure will become apparent to those of ordinary skill in the art through consideration of the following detailed description and the accompanying drawings.

Figure 1:
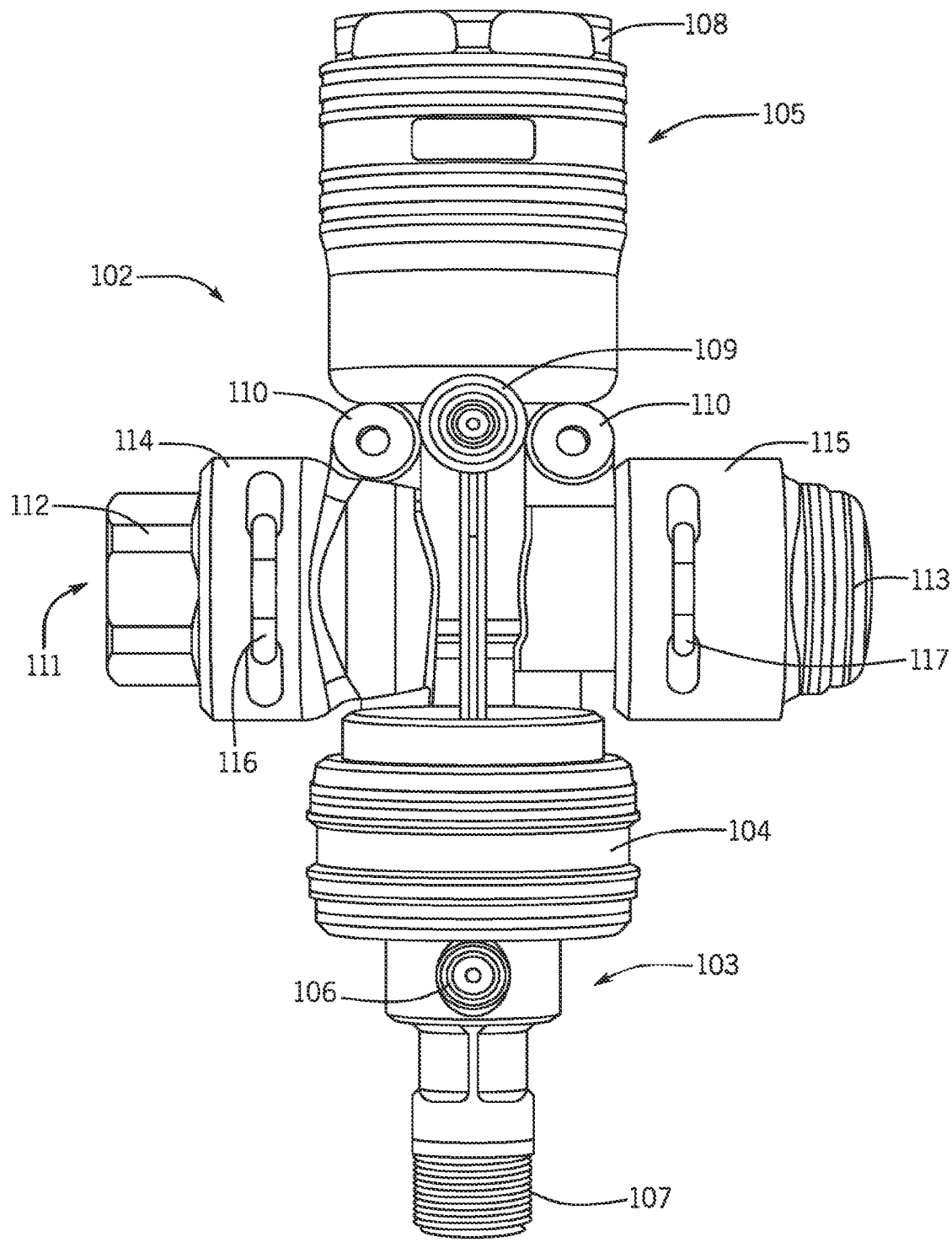
FIG. 1 is a schematic illustration of a single inlet, single outlet manifold coupled to an eductor, according to certain implementations.
Figure 2:
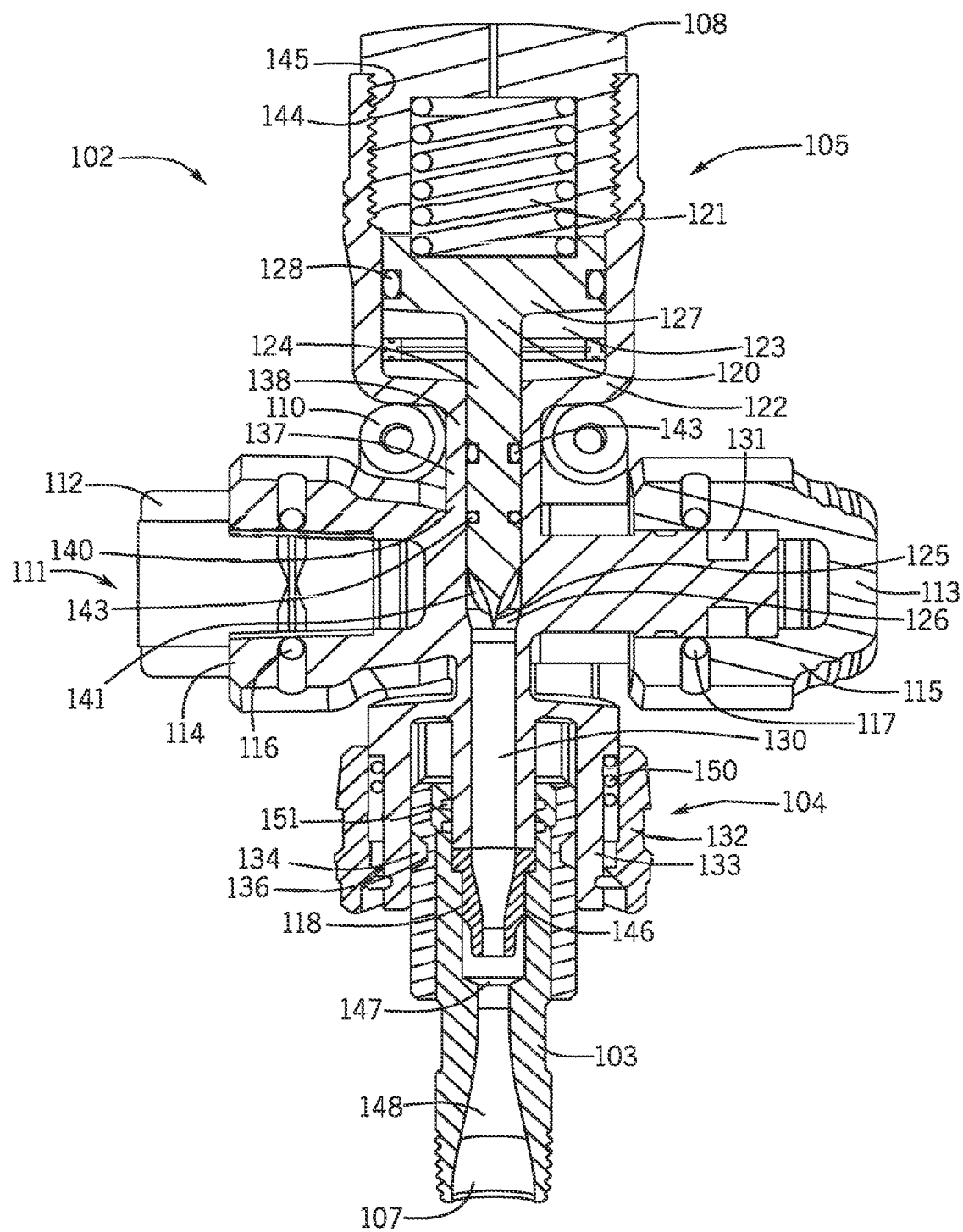
FIG. 2 is a schematic illustration of a cross-section of the manifold and eductor of FIG. 1.

Referring to the drawings, FIGS. 1 and 2 illustrate a manifold 102 coupled to an eductor 103 via a coupling mechanism 104. The manifold is a single inlet, single outlet manifold with an integrated valve 105. As shown, the coupling mechanism 104 may also be formed integrally with the manifold 102. The eductor 103, which may also be an applicator, injector or eductor assembly, defines an eductor inlet 106 for receiving and channeling various concentrated substances into the body of the eductor 103, and an eductor outlet 107 for delivering diluted fluids to a target site. Opposite the eductor 103, the integrated valve 105 of the manifold 102 includes a spring cap 108. The manifold 102 also defines an air inlet 109 and includes two mounting feet 110. The mounting feet 110 may be part of an integrally formed mounting structure configured to releasably or reversibly secure the manifold 102 to various external surfaces and/or objects.

In operation, pressurized air received at the air inlet 109 may open and close the integrated valve 105, thereby controlling the delivery of a motive fluid into the eductor 103 for mixing with a concentrated substance received through the eductor inlet 106. As such, the integrated valve 105 may be referred to as an "air valve." The motive fluid, e.g., water, is received through a motive fluid inlet 111 that may be fluidly connected with a source supply via tubing, piping, or the like. As shown, one or more inlet connectors 112 may be coupled with the manifold 102. In some examples, the inlet connectors 112 may be defined by the manifold 102. The inlet connectors 112 may couple the manifold 102 to additional manifolds or other components. Because the manifold 102 is modular, it may also be referred to as a "manifold section" in some embodiments that include multiple manifolds coupled together in an assembly arrangement.

Opposite the motive fluid inlet 111, the manifold 102 shown in FIG. 1 includes an end cap 113. The end cap 113 may confine the motive fluid within the manifold 102 to an internal passageway starting at the inlet 111 and ending at the eductor outlet 107. Because the manifold 102 may receive motive fluid at the motive fluid inlet 111, the section of the manifold 102 defining the inlet 111 may be referred to as the inlet branch 114. The opposite end, coupled with an end cap 113, may be referred to as the connector branch 115, configured to couple with an end cap 113 or an additional manifold 102, via another inlet connector in some examples. An inlet locking member 116 is shown inserted into the inlet branch 114. In embodiments, the inlet locking member 116 may be a spring clip configured to couple the inlet connector 112 with the inlet branch 114. An end cap locking member 117 is shown similarly inserted into the connector branch 115, opposite the inlet branch 114, where it couples the connector branch 115 to the end cap 113. Like the inlet locking member 116, the end cap locking member 117 may be a spring clip in embodiments. In operation, the manifold 102 may receive a motive fluid at the motive fluid inlet 111, controllably direct the motive fluid into the eductor 103 via operation of the integrated valve 105, mix the motive fluid with a concentrated substance received via the inlet 106 of the eductor 103, and emit the resulting fluidic mixture from the eductor 103 via the eductor outlet 107.

At the inlet branch 114, the inlet 111 may receive a variety of motive fluids, e.g., pressurized fluids, and direct them into an internal channel defined by the manifold 102. The motive fluid may also be referred to as a "bulk" fluid, which may be a liquid, typically water. The pressure of the motive fluid upon receipt at the inlet 111 and within the manifold 102 may vary. In embodiments, the pressure of the motive fluid may be range from about 250 to about 750 psi, about 300 to about 700 psi, about 350 to about 650 psi, about 400 to about 600 psi, about 450 to about 550 psi, about 475 to about 525 psi, or about 500 psi. The motive fluid may be used to mix with and dilute various substances, e.g., chemicals and/or gases, which may be received at the eductor 103 in a concentrated state. Diluting such substances may be necessary to reduce waste, save costs, and/or prevent undesirable effects caused by spraying overly concentrated chemicals onto target sites and materials. Selectively mixing the motive fluid with different concentrated substance(s) received at the eductor 103 before emission from the eductor outlet 107 may dilute the concentrated substances to a sufficient level. In some examples, the same motive fluid may be used regardless of the concentrated substances received at the eductor 103. In other examples, the motive fluid may vary depending on the substances received at the eductor 103. The substances received at the eductor 103 may include one or more chemicals, gases, soaps, detergents, rinsing agents, foaming agents, and/or liquid waxes. For consistency, the input of "chemicals" at the eductor 103 will be referred to herein.

The integrated valve 105 may operate to selectively release motive fluid into the eductor 103. As shown, the integrated valve 105 may be formed integrally with the body of the manifold 102, such that the valve 105 is not a separate component that is detachable from the body of the manifold 102. By forming a valve with a manifold body such that the resulting manifold 102 is a unitary construction with an integrated valve 105, the number of discrete manifold components may be reduced relative to other manifold designs. The reduced number of components included in the manifold 102 may decrease the likelihood of leak formation. Such reduced leakage may be bidirectional in that the manifold 102 may be better sealed to prevent the penetration of external fluids into the interior of the manifold, as well as the loss of fluids from within the manifold 102 to the external environment. Corrosive effects caused by water and various chemicals may be substantially avoided as a result. In addition, minimized leakage may maintain the desired water and air pressure levels within the manifold 102.

The integrated valve 105 may be controlled at least in part by the input of air via the air inlet 109. For instance, the input of air into the inlet 109 may increase an air pressure within the housing of the integrated valve 105, which may cause the integrated valve 105 to open, thereby allowing a motive fluid to enter the eductor 103. Likewise, when the input of air is stopped, the integrated valve 105 may close, preventing the motive fluid from entering the eductor 103, and stopping the emission of diluted chemicals from the eductor outlet 107.

The eductor 103 shown in FIG. 1 is axially aligned with the integrated valve 105. Unlike the integrated valve 105, the eductor 103 may be a separate, detachable component not integrally formed with the manifold 102. An assortment of eductors 103 may be interchangeably coupled with the manifold 102. In additional examples, the eductor 103 may be integrally formed with the manifold 102. In operation, one or more chemical inputs may passively enter the eductor inlet 106, where they may be drawn into the body of the eductor 103 via a suction force generated by a Venturi zone positioned within the eductor 103. The eductor inlet 106 may be connected to a source supply, e.g., tank, of concentrated input via tubing and/or piping. In some examples, a source supply connected to the eductor inlet 106 may constantly supply chemicals to the eductor 103 such that the eductor 103 may readily draw the chemicals therein upon selective passage of motive fluid therethrough. In the orientation shown, the integrated valve 105 is positioned above the eductor 103. The orientation of the manifold 102 may vary in some examples, such that the eductor 103 may be positioned above, adjacent to, or diagonal to the integrated valve 105.

The mounting feet 110 shown in FIG. 1 may secure the manifold 102 to a mounting surface, e.g., a wall. As shown, the mounting feet 110 may be integrally formed with the manifold 102. In embodiments, the mounting feet 110 may be loosened so that the manifold 102 may be releasably or reversibly mounted on a surface. Alternative or additional connection means may also be used to mount the manifold 102 to an external surface. For example, various fasteners and/or adhesives may be used.

FIG. 2 illustrates a cross-section of the manifold 102 and eductor 103 of FIG. 1. As shown, the manifold 102 may include numerous integrally constructed components, including the integrated valve 105 and a manifold outlet nozzle 118. FIG. 2 also shows the internal components of the integrated valve 105, which may include a piston or plunger 120 and a plunger spring 121, each enclosed within a plunger housing 122. As shown, the plunger housing 122 and the housing of the integrated valve 105 may be molded as one unitary component. The plunger housing 122 may define an internal air fill space 123. The plunger 120 may include an elongate plunger arm 124 that defines a plunger tip 125 positioned opposite the plunger spring 121. As shown, the plunger tip 125 may rest in a plunger seat 126 in one position. The plunger 120 may also define a plunger head 127, positioned adjacent to the plunger spring 121. The plunger head 127 may include one or more plunger head O-rings 128.

The motive fluid inlet 111 defines an opening to a common fluid channel defined within the manifold 102. As such, the motive fluid inlet 111 may also be referred to as a "common channel inlet" in some examples. Upon opening the integrated valve 105, at least a portion of the motive fluid may be released into an outlet passageway 130 defined by the manifold 102, which directs the motive fluid into the eductor 103 via the manifold outlet nozzle 118. The end cap 113 may be coupled to the connector branch 115 of the manifold 102 via one or more bands 131 and the end cap locking member 117. The coupling mechanism 104 used to couple the eductor 103 to the manifold 102 includes a sleeve 132 surrounding a collar 133. Jaws 134 extending radially inward from the collar 133 may engage with a circumferential recess 136 defined by the eductor 103. As shown, the motive fluid inlet 111, the manifold outlet nozzle 118, the plunger housing 122 of the integrated valve 105, the collar 133, and a mounting structure, e.g., the mounting feet 110, may all be integrally constructed in one unitary manifold 102.

Figure 3:
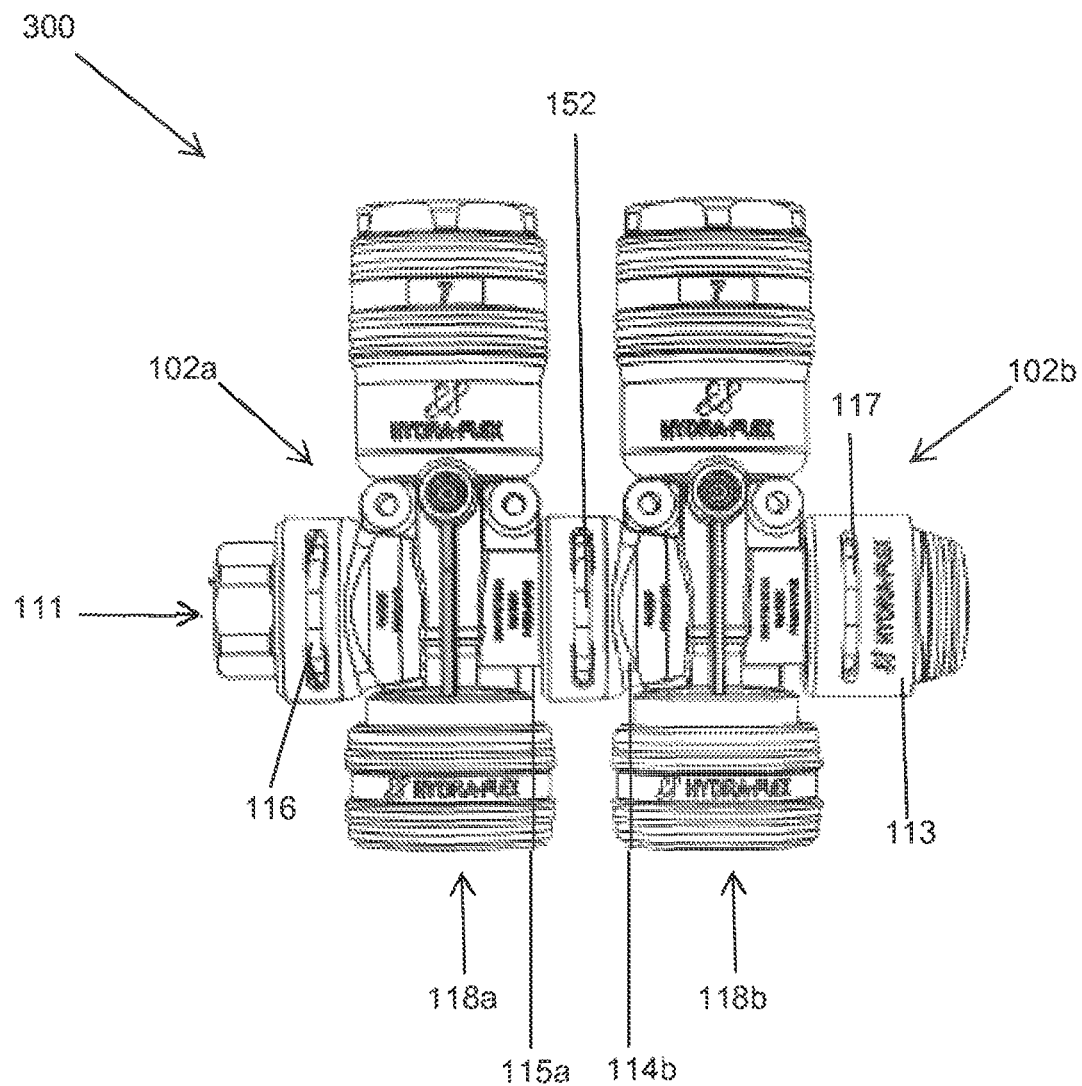
FIG. 3 is a schematic illustration of a manifold assembly defining a single inlet and two outlets, according to certain implementations.

In operation, a motive fluid may be received at the manifold 102 through the fluid inlet 111 at the inlet branch 114. The inlet branch 114 may be coupled with the inlet connector 112 for coupling the manifold 102 to one or more additional manifolds, for example as shown in FIG. 3. Thus, one or more motive fluids may be received at the inlet 111 directly from a supply source connection, or indirectly through one or more additional manifolds, or manifold sections. After input of the motive fluid, the fluid may enter a common fluid channel, where it may be prevented from entering the outlet passageway 130 by the integrated valve 105.

The plunger housing 122 of the integrated valve 105 may be formed integrally with the manifold 102. Enclosed within the plunger housing 122, the plunger head 127 defined by the plunger 120 may be positioned to contact the plunger spring 121. As shown, the plunger arm 124 may extend away from the spring 121. The plunger housing 122 may define an integral plunger arm receiving portion 137 that encloses the plunger arm 124. The plunger arm receiving portion 137 may define a first plunger arm receiving portion 138 configured to fluidly couple with the air inlet 109 and a second plunger arm receiving portion 140 configured to couple with the common fluid channel. Relative to the plunger spring 121, the distal end of the second plunger arm receiving portion 140 may be fluidly coupled to the common fluid channel. Because the plunger housing 122 may be fluidly coupled with the air inlet 109, air injected into the inlet 109 may fill the air fill space 123 of the plunger housing 122. Injection of air into the air fill space 123 may cause the plunger 120, particularly the plunger head 127, to move against the force of the plunger spring 121 in the direction of the arrow. Movement of the plunger 120 in this direction may lift the plunger tip 125 such that the plunger tip is removed from a fluid inlet defined by the plunger seat 126. Once uncovered, the fluid inlet defined by the plunger seat 126 may allow the motive fluid to escape from the internal common fluid channel, via a dispensing fluid outlet 141, into the outlet passageway 130. In other words, the plunger tip 125 may seal an opening to the outlet passageway 130 when the plunger 120 is in a first, closed position. The closed position may be maintained by the plunger spring 121, which exerts a constant downward force on the plunger 120. In this manner, the spring 121 may close the integrated valve 105. The plunger 120 may be moved to a second, open position by the injection of pressurized air via the air inlet 109 into the air fill space 123 defined by the plunger housing 122. The air may urge the plunger 120 upward, pushing the plunger head 127 against the spring 121, such that the spring may compress between the plunger head 127 and an internal surface of the spring cap 108. Movement of the plunger 120 in this manner may cause the plunger tip 125 to be removed from a fluid inlet defined by the plunger seat 126, thus allowing the motive fluid to enter the outlet passageway 130 via the dispensing fluid outlet 141. The plunger seat 126 may be defined by the integrally-formed portion of the manifold 102 and may sealingly engage the plunger arm 124 to block or close the fluid inlet defined by the plunger seat 126 when the plunger spring 121 moves the plunger arm 124 to the closed position. In this manner, the plunger 120 and the manifold 102 may be free of additional sealing components for purposes of closing and/or sealing the plunger seat fluid inlet.

As shown in FIG. 2, one or more plunger arm O-rings 143 may be circumferentially arranged about the plunger arm 124 to provide a seal between the plunger arm 124 and the plunger arm receiving portion 137 of the plunger housing 122 to prevent fluid, e.g., a motive fluid such as water, from escaping an interior of the manifold 102 and entering the air fill space 123 of the integrated valve 105. For instance, the O-rings 143 may provide a seal that separates the first and second plunger arm receiving portions 138, 140 from one another. In some examples, the plunger arm O-rings 143 may provide an air-tight seal in the manifold 102 on opposite sides of the air inlet 109 in order for the integrated valve 105 to retain pressurized air during operation and cause the plunger arm 124 to move in the manner necessary to effect the opening of the integrated valve 105. In embodiments, the number and location of plunger arm O-rings 143 may vary. In some examples, the plunger arm O-rings 143 may be included in the plunger housing 122.

As further shown in FIG. 2, the plunger housing 122 may define an internal, circumferential threaded portion 144. The threaded portion 144 may be complementary to an exterior threaded portion 145 defined by the spring cap 108. Thus, the spring cap 108 may be adapted to screw into the plunger housing 122 of the manifold 102 via complementary threaded portions defined by the two components. Together, the spring cap 108 and the plunger housing 122 may completely enclose the plunger 120 and plunger spring 121 within the manifold 102. The plunger head 127 may also include one or more circumferential O-rings 128 that may sealingly engage with an internal circumference of the plunger housing 122 proximate a first side of the integrated valve 105 with respect to the air inlet 109. The plunger head O-rings 128 may prevent the leakage of air from the air fill space 123 to maintain air pressure levels therein that may be necessary to effect movement of the plunger 120 upon injection of air at the air inlet 109.

When attached to the manifold 102, the eductor 103 may be in fluid communication with the outlet passageway 130. In particular, the eductor 103 may define a cavity 146 adapted to receive the manifold outlet nozzle 118. Through the manifold outlet nozzle 118, the motive fluid may exit the manifold 102 and enter the eductor 103, where it may be mixed with a chemical input. In embodiments, the cavity 146 may be configured as an eductor leg for coupling to the supply source of concentrated chemicals or gases.

The eductor 103 may be configured as a Venturi-style apparatus, such as the Venturi eductor of U.S. Pat. No. 8,807,158. As such, the eductor 103 may define a Venturi throat 147 and a diverging flow path 148 to allow a combination of motive fluid and chemical to be conducted away from the eductor 103 and the manifold 102 for dispensing. The Venturi throat 147 may define a cross-sectional diameter that is less than the cross-sectional diameter of the outlet passageway 130 and the eductor outlet 107. As a result, the motive fluid velocity may increase when passing through the Venturi throat 147 and decrease after exiting the Venturi throat 147. Consequently, pressure within the Venturi throat 147 may decrease, forming a first pressure zone upstream of the Venturi throat and a second pressure zone within it. The fluid pressure within the first pressure zone may be higher than that in the second pressure zone. In embodiments, the pressure within the first pressure zone may range from about 250 to about 750 psi, about 300 to about 700 psi, about 350 to about 650 psi, about 400 to about 600 psi, about 450 to about 550 psi, about 475 to about 525 psi, or about 500 psi. The pressure within the second pressure zone may range from about 50 to about 350 psi, about 100 to about 300 psi, about 150 to about 250 psi, about 175 to about 225 psi, or about 200 psi. The low pressure within the Venturi throat 147 may create a suction force that draws chemicals into a mixing zone, where it mixes with the motive fluid. The resulting mixture may then pass through the diverging flow path 148 and outward through the eductor outlet 107.

In embodiments, the eductor 103 may be removably detachable from the manifold 102 via the coupling mechanism 104. The coupling mechanism 104 may be variously configured depending on multiple considerations, such as the size of the manifold 102 and the eductor 103, the desired level of user accessibility, and/or the manner and ease by which the eductor 103 is attached to and removed from the manifold 102. Accordingly, the coupling mechanism 104 may include various components and/or surfaces defined by or included in the manifold 102 that are complementary to components and/or surfaces defined by or included in the eductor 103.

As shown in FIG. 2, for example, the coupling mechanism 104 may include one or more jaws 134, a sleeve 132, a collar 133, a coupling spring 150, a spiral retaining ring 151 and the manifold outlet nozzle 118. The collar 133 may be integrally formed with the manifold 102 and may facilitate securing the jaws 134 to the eductor 103 by providing a surface for the jaws 134 to bear against. Together, the collar 133, jaws 134 and manifold outlet nozzle 118 may receive the body inlet 146 of the eductor 103, which may be configured with an external and/or an internal profile adapted for coupling with the coupling mechanism 104. A coupling spring 150 may be reversibly actuated to enable the coupling and release of the eductor 103. As further shown in FIG. 2, the eductor 103 may include a circumferential indentation or recess 136 configured to reversibly mate with the protruding jaws 134 of the coupling mechanism 104. In embodiments, the eductor 103 may include a threaded connection, a flanged connection, a latch, a sliding pin, and/or a push-in connection to facilitate mating with the coupling mechanism 104. While the particular example shown in FIG. 2 includes two wedge-shaped jaws 134 configured to engage with a complementary external recess 136 defined by the eductor 103, any number of jaws 134 in any configuration may be used to secure the manifold 102 to the eductor 103. In some examples, the jaws 134 may be constructed of metal, e.g., stainless steel, or of an inert polymer composition. The spiral retaining ring 151 may be included in the eductor 103 and or the manifold outlet nozzle 118. In some implementations, the manifold outlet nozzle 118 may include one or more O-rings adapted to seal against an internal circumference of the eductor 103. In some examples, the eductor 103 may include one or more O-rings adapted to seal against an external surface of the manifold outlet nozzle 118.

In operation of the coupling mechanism 104, when the collar 133 and sleeve 132 are moved to a first position, e.g., under the force of the coupling spring 150, the jaws 134 may be restrained from moving and may firmly grasp the eductor 103, thereby enabling a sealing connection with the manifold outlet nozzle 118. When it is desired to remove the eductor 103 from the manifold 102, the sleeve 132 may be lifted or rotated, e.g., by hand, to provide the jaws 134 with a clearance that enables the jaws to circumferentially move out of position, thereby allowing the eductor 103 to be detached from the manifold 102. Lifting or rotating the sleeve 132 may be performed against the resting state of the coupling spring 150, such that the coupling mechanism 104 returns to a locked state upon releasing the sleeve 132. In some examples, the coupling spring 150 may be a spiral or torsion spring.

In some examples, the coupling mechanism 104 may include a threaded connection between the sleeve 132 and the collar 133 which may enable the sleeve 132 to rotate about the collar 133 such that in a first position of the sleeve, the collar 133 engages the jaws 134 about the external circumference, thereby locking the eductor 103 into a secure engagement with the manifold 102. In a second position of the sleeve 148, the collar 133 disengages the jaws 134 to enable a user to slide the collar 133 out of the way of the jaws 134, thereby allowing the eductor 103 to be removed from the manifold 102. In this second position, the collar 133 may constrain the jaws 134 from moving so far as to fall out of their respective retaining slots in the manifold. The coupling spring 150 may hold the sleeve 132 in the first position such that the collar 133 is urged into a circumferential engagement with the jaws 134.

In embodiments, the coupling mechanism 104 may not require rotation of the sleeve 132. For instance, the sleeve 132 may include an internal bead or flange adapted to cause the collar 133 to engage the jaws 134 in a compression lock. In this configuration, the sleeve 132 may translate along the collar 133 from a first position to a second position without the requirement that the sleeve 132 be rotated. In the first position of the sleeve 132, the collar 133 may compress the jaws 134 in a compression lock with the eductor 103, thereby establishing a secure coupling with the manifold 102. In the second position of the sleeve 132, the collar 133 may move to a relaxed position such that the internal circumference of the collar disengages the jaws 134 to enable the eductor 106 to be removed from the manifold 102.

In some examples, the coupling mechanism 104 may include one or more recesses, ledges, or shelves defined by the manifold outlet nozzle 118 and/or the collar 133. In such examples, the eductor 103 may include one or more slidable latches or pins, biased by a spring, that extend away from the surface of the eductor 103 in a resting state of the spring. The latches or pins may reversibly mate with the shelf portions defined by the manifold 102, such that after extending into a shelf portion, a latch may rest thereon, securing the eductor 103 to the manifold against the downward force of gravity.

As further shown in FIG. 2, the end cap 113 may enclose one end of the manifold 102. As a result, the manifold 102 shown is a single inlet, single outlet manifold. The end cap 113 may be coupled with the manifold 102 according to various mechanisms. In embodiments, the end cap 113 may include one or more circumferential O-rings to prevent leakage of motive fluid out of the manifold 102. In addition or alternatively, the manifold 102 may include one or more O-rings in circumferential engagement with an internal surface of the end cap 113.

In some implementations, the coupling component, e.g., spring clip, used for coupling and/or locking manifolds 102 to other manifolds 102, manifolds to end caps 113, and/or manifolds to inlet connectors 112, may be a highly-loaded component which may exert a force on the manifold or other component that requires load distribution. For example, the manifold may include a metallic (e.g., stainless steel) insert in a region corresponding to where the coupling component is to engage the manifold, such as the band 131 shown in FIG. 2. The metallic band 131 may be molded into the integrally-constructed portion of the manifold 102 during manufacture. In some implementations, the metallic band 131 may be arranged along the connector branch 115, proximate the outlet of the common fluid channel. In another example, the inlet connector 112 may be constructed of metal in order to distribute the load exerted by the inlet locking member 116 across the connector. In some implementations, spring clips used herein may be metallic, e.g., stainless steel. Alternatively, one or more spring clips may be plastic. For instance, the clip may be a high-strength engineered plastic such as Ultem. It may also be made of fiber reinforced matt or other material, so long as sized appropriately to take the manifold 102 separating loads imposed by the manifold water pressure.

In embodiments, various components of the manifold 102 may be integrally constructed. The integral construction may, for instance, be by molding (e.g., injection molding) a chemically inert polymer such as HDPE, PTFE or PVDF.

Some non-integral components of the manifold may be constructed of inert polymers, such as the plunger 120, while others may be constructed of metal, such as spring clips, helical springs and inlet connectors. To decrease the cost of the parts and/or improve chemical resistance, it may be desirable to have components of the manifold 102 molded from a plastic material. These may additionally or alternatively be machined or additive manufacturing may be used for their construction. The assemblies of the present disclosure may be particularly useful in the car wash and industrial cleaning industries.

FIG. 3 illustrates a manifold assembly 300 including a single inlet and two outlets, according to certain implementations. As shown, the manifold assembly 300 includes two modular manifolds: a first manifold 102a (depicted on the left) and a second manifold 102b (depicted on the right), each manifold (or manifold "section") defining a single inlet and a single outlet, consistent with the representations of FIGS. 1 and 2. The manifolds 102a, 102b are joined together in a side-by-side arrangement, such that the components of each individual manifold 102a, 102b are oriented in the same direction. The individual manifolds 102a, 102b may be fluidly coupled by the common channel fluid channel that extends laterally between them (shown in FIG. 4). In operation, a motive fluid may enter the manifold assembly 300 through the fluid inlet 111 and exit the assembly through each of two manifold outlet nozzles 118a, 118b. While not depicted in FIG. 3, an eductor may be coupled with each of the two manifold sections.

The individual manifolds 102a, 102b, may be joined to one another using various coupling devices described herein. For example, the manifolds 102a, 102b may include or define complementary threaded portions, such that the manifolds may be screwed together by a user. In embodiments, one or more connector locking members 152, which in the example shown is a spring clip, may extend into one or more complementary receiving apertures defined by the connector branch 115a of the first manifold 102a, and the inlet branch 114b of the second manifold 102b. Upon bringing the two manifolds 102a, 102b together in the arrangement shown in FIG. 3, the apertures may align, thereby allowing insertion of the spring clip 152 to reversibly lock the two manifolds in place. In some examples, the manifolds 102a, 102b may be joined together by a latching mechanism, one or more coupling pins and/or a snap-lock mechanism. In embodiments, one or both manifolds 102a and/or 102b may include a button that may be pressed or otherwise actuated by a user to lock or unlock the manifolds. The manifolds 102a, 102b may also be joined using one or more fasteners, e.g., bolts and/or screws. In some examples, the manifolds 102a, 102b may be sealingly coupled using, for example, internally positioned sealing rings, such as O-rings. See e.g., FIG. 6. Similar to the embodiment shown in FIG. 1, the terminal end of the common fluid channel, e.g., the end defined by the connector branch 115a that can be coupled with an adjacent fluid inlet 111b via an inlet connector 112, may be sealed by an end cap 113 and secured by an end cap locking member 117, e.g., a spring clip. When coupling a manifold, such as manifold 102b, to an end cap 113, the end cap locking member 117 may slide into an internally-protruding receiving aperture defined by the end cap 113. An outwardly protruding arc of the end cap locking member 117 may couple to an external circumference of the manifold housing or band 131, as shown in FIG. 7. Other locking members, e.g., 116 and 152, may be configured similarly or the same as the aforementioned spring clip.

According to the present disclosure, spring clips may couple the manifolds 102a, 102b to inlet connectors 112, end caps 113 and/or additional modular manifold sections. In some examples, the manifold components and/or sections may also be coupled by various connection means. For example, quick-connect fitting components commonly referred to as "push-to-connect," "quick connect couplers," "water quick connect," and other names may be used. The manifold components and/or sections may also be joined by flange connections that are joined by collars that are snapped into place to resist the separating force of the manifolds 102a, 102b. These collars may be snapped into place over two joining flanges where a flange is on each of two manifold sections 102a, 102b or a manifold section and an end cap, for instance.

While the manifold assembly 300 illustrated in FIG. 3 includes two manifold sections 102a, 102b, manifold assemblies may include more than two manifold sections. In addition or alternatively, manifold assemblies may be arranged in different configurations. For example, manifold assemblies may include non-linear arrangements of manifold sections 102. Such embodiments may include adapters positioned between each manifold section. The adapters may be variously sized and shaped, and in some examples, customized to a user's specifications. Variously sized/shaped adapters may allow the manifold assemblies to be mounted in small and/or irregularly shaped spaces unable to accommodate laterally-extending manifold assemblies.

Whether standing alone or arranged in an assembly, the manifolds 102 disclosed herein may maintain the motive fluid at a specific pressure or pressure range from the moment of input to the moment of output. For instance, the integrated valve 105 and manifold outlet nozzle 118 may be sized to allow for a small pressure loss of less than about 10 psi from the fluid inlet 111, through the manifold 102, to each manifold outlet nozzle 118. In embodiments, the pressure loss may range from about 1 psi to about 100 psi, about 1 to about 50 psi, about 1 to about 25 psi, about 1 to about 20 psi, or about 5 to about 15 psi.

In some examples, each manifold 102 may be configured to receive, via the air inlet 109, air pressurized at about 80 to about 100 psi, and water pressure at the manifold outlet nozzle 118 may be at about 500 psi, which may be useful in certain car wash applications that use high-pressure, rotating nozzles for rinsing and cleaning. In another example, the air pressure upon receipt by the manifold 102 may be the same as the water pressure at the manifold outlet nozzle 118. In such examples, the air pressure and water pressure may be at about 280 psi, which may be useful in certain eductor applications applicable in both the car wash and the industrial cleaning industries.

Figure 4:
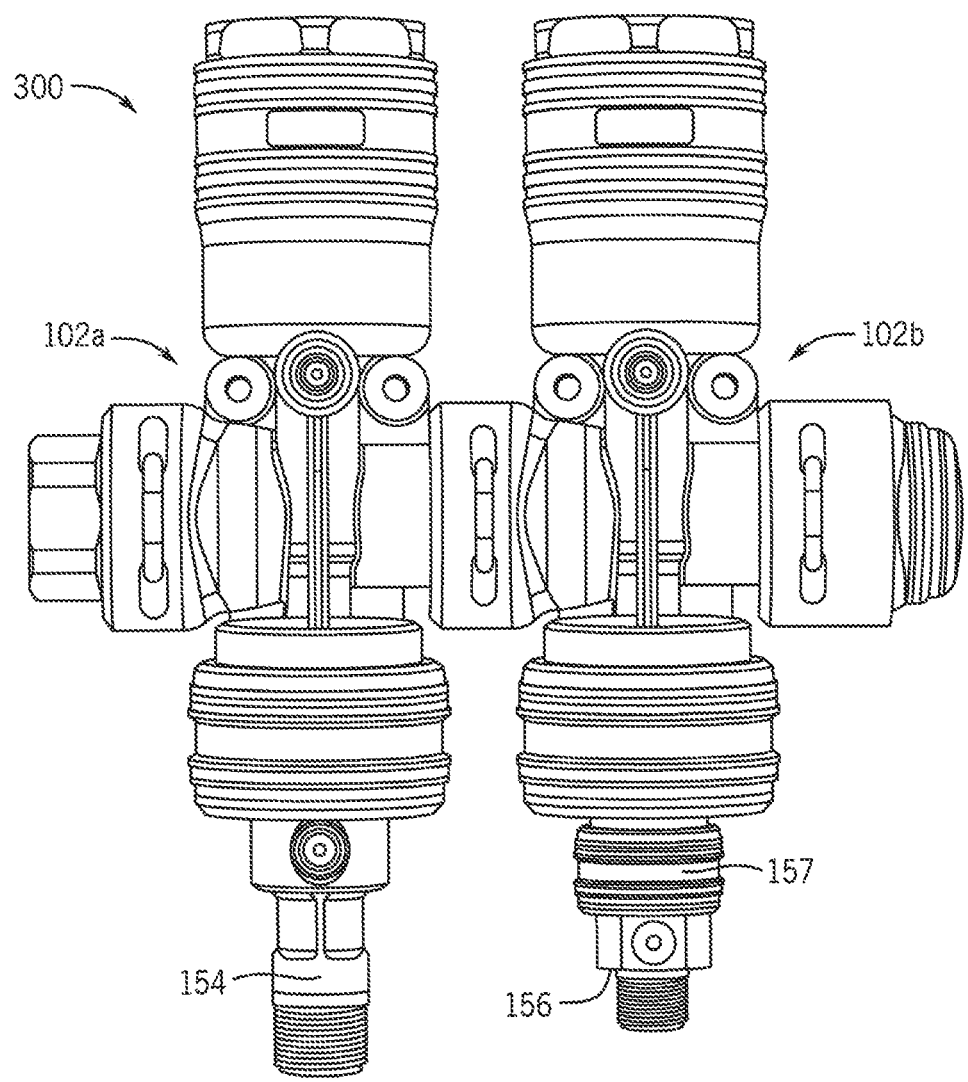
FIG. 4 is a schematic illustration of the manifold assembly of FIG. 3 with a large eductor and a small eductor joined thereto, according to certain implementations.

FIG. 4 illustrates the manifold assembly 300 with a large eductor 154 and a small eductor 156 joined thereto. The large eductor 154 is fluidly coupled to the left manifold 102a via the coupling mechanism 104 as shown and described in connection with FIG. 2. The small eductor 156 is fluidly coupled to the right manifold 102b by way of an adapter 157. The adapter 157 may enable different applicators or eductors to be fluidly coupled to a manifold outlet nozzle 118 of the manifold assembly 300.

Generally, the adapter 157 is a coupling mechanism configured to couple to an outlet or a manifold outlet nozzle 118 at one end, and includes a mechanism configured to accept a smaller or larger diameter eductor 103 at a second end. In some implementations, the adapter 157 may include the same coupling mechanism as the coupling mechanism 104 shown and described in with FIG. 2, but scaled to a different size to enable the adapter to receive the smaller or larger diameter eductor. Accordingly, in the implementation of FIG. 4, the adapter 157 is configured with the coupling mechanism of FIG. 2 and is scaled to a smaller size to enable coupling with the smaller diameter eductor 156.

Different manifold outlets may have differently sized applicators, eductors, nozzles or other devices requiring flow. Because eductors may be configured based on their application of use, the implementations of the present disclosure may employ adapters to enable a wide range of applicators, eductors, and/or eductor assemblies to be fluidly coupled to the manifold 102 or manifold assembly 300. In this fashion, the manifold may be further modular as it can accommodate many types of nozzles, applicators or eductors.

Figure 5:
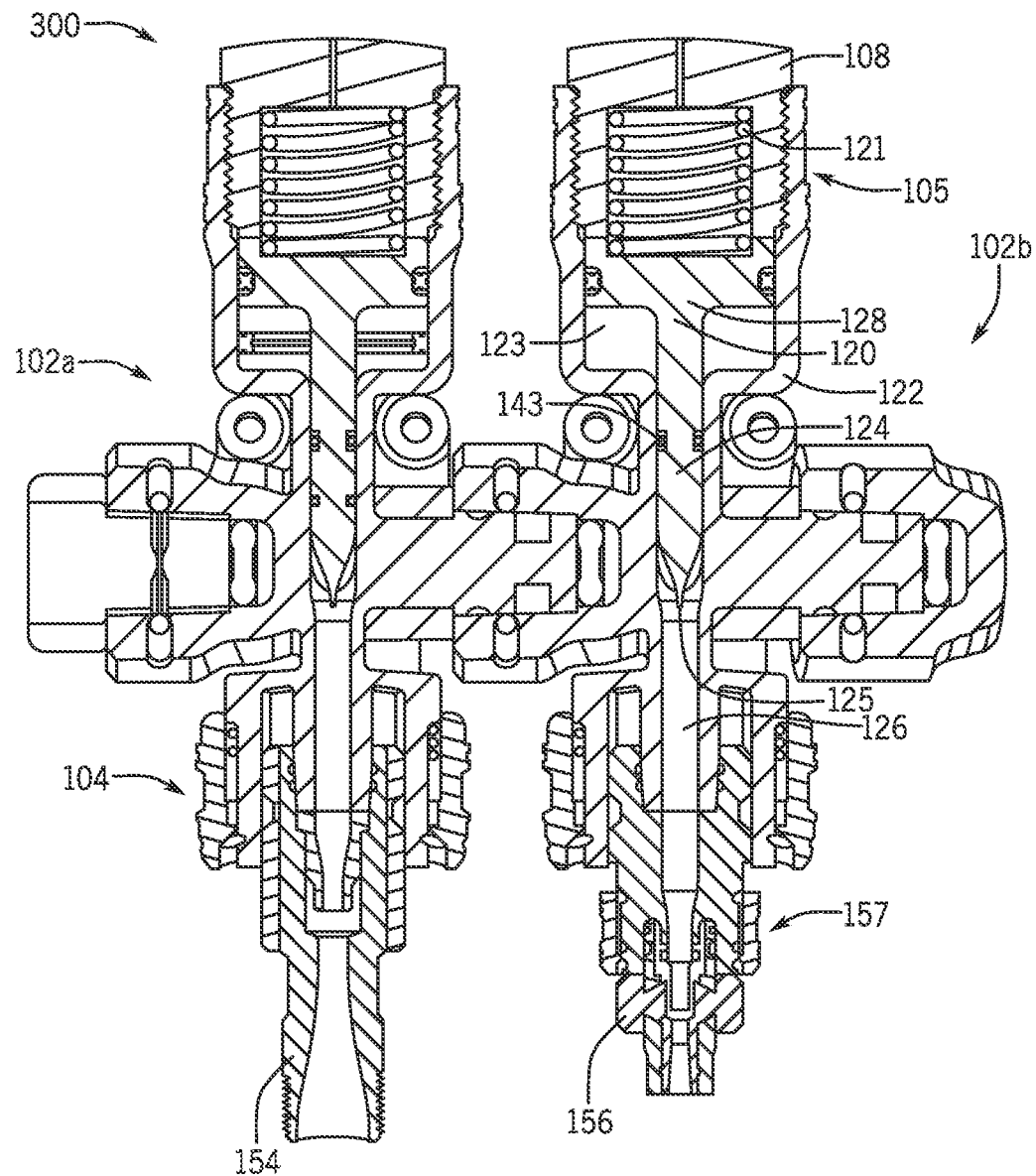
FIG. 5 is a schematic illustration of a cross-section of the manifold assembly and eductors of FIG. 4.

FIG. 5 illustrates a cross-section of the integrated manifold assembly 300 and eductors 154, 156 of FIG. 4. Each manifold 102a, 102b included in the manifold assembly 300 includes an integrated valve 105. The internal components of each integrated valve 105 resemble those shown in FIG. 2. For instance, each valve 105 includes a plunger 120 and a plunger spring 121, each of which is enclosed within a plunger housing 122 and a spring cap 108. Each plunger 120 includes an elongate plunger arm 124 that defines a plunger tip 125 at a distal end of the plunger arm opposite the plunger spring 121. The plunger tip 125 rests, in a closed position, on a plunger seat 126. The spring 121 of each respective integrated valve 105 may be held between the spring cap 108 and the plunger head 127 and may transmit a force from the plunger 120 against the spring cap 108. A plunger head O-ring 128 is included within each plunger 120, and one or more plunger arm O-rings 143 in each plunger arm 124. Each manifold section 102 may be identical in this embodiment.

In this example, the integrated manifold assembly 300 is configured as an air-powered valve that includes integrated air valves 105. As such, the air valves 105 of the manifold assembly 300 are closed by spring pressure and opened by air pressure, according to the same mechanism used to open and close the integrated valve 105 shown in FIG. 2. In some examples, each manifold 102a, 102b may be independently operated such that air may be received at one manifold, but not the other. For instance, the integrated valve 105 of the left manifold 102a may be moved to an open position, while the integrated valve 105 of the other manifold 102b may remain in a closed position. In other words, one or more sections 102 may be in an "off" state in which its integrated valve 105 is closed, while one or more other sections 102 may be in an "on" state, in which its integrated valve 105 is open. The selective opening and closing of each valve may be accomplished by selectively pressurizing individual plunger housings 122 with air. Independent operation of each manifold may thus enable different chemicals to be emitted at different times, without altering the chemical sources coupled with the manifold assembly 300. In other embodiments, each manifold within a manifold assembly may be operated in a coordinated manner such that the integrated valve 105 defined by each manifold is opened and closed in unison. In some examples, the coordination between individual manifold sections within a manifold assembly may be controlled remotely, for example using a computer.

Figure 6:
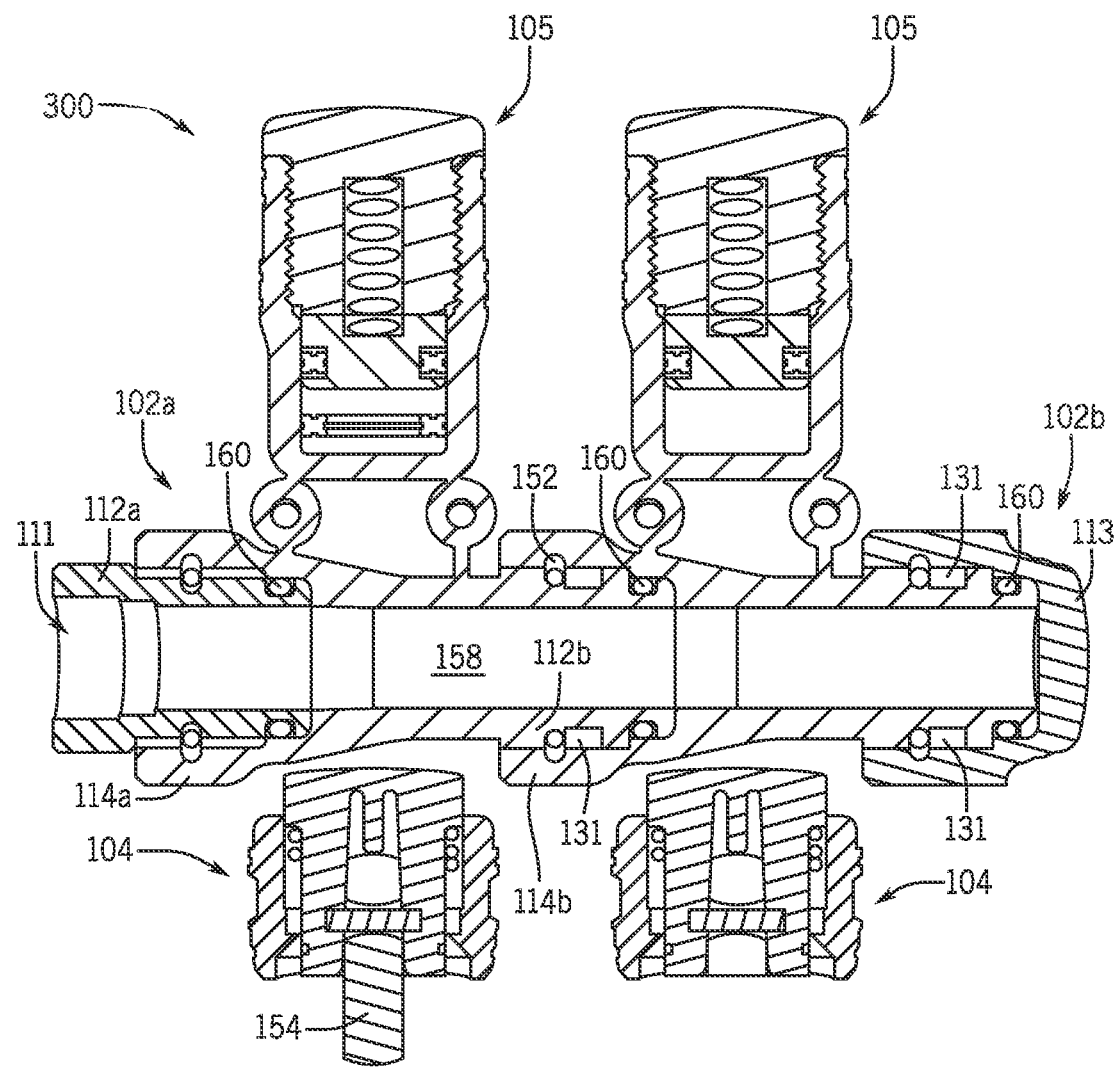
FIG. 6 is a schematic illustration of a cross-section of the manifold assembly and eductors of FIG. 4 through a common fluid channel of the manifold assembly.
Figure 7:
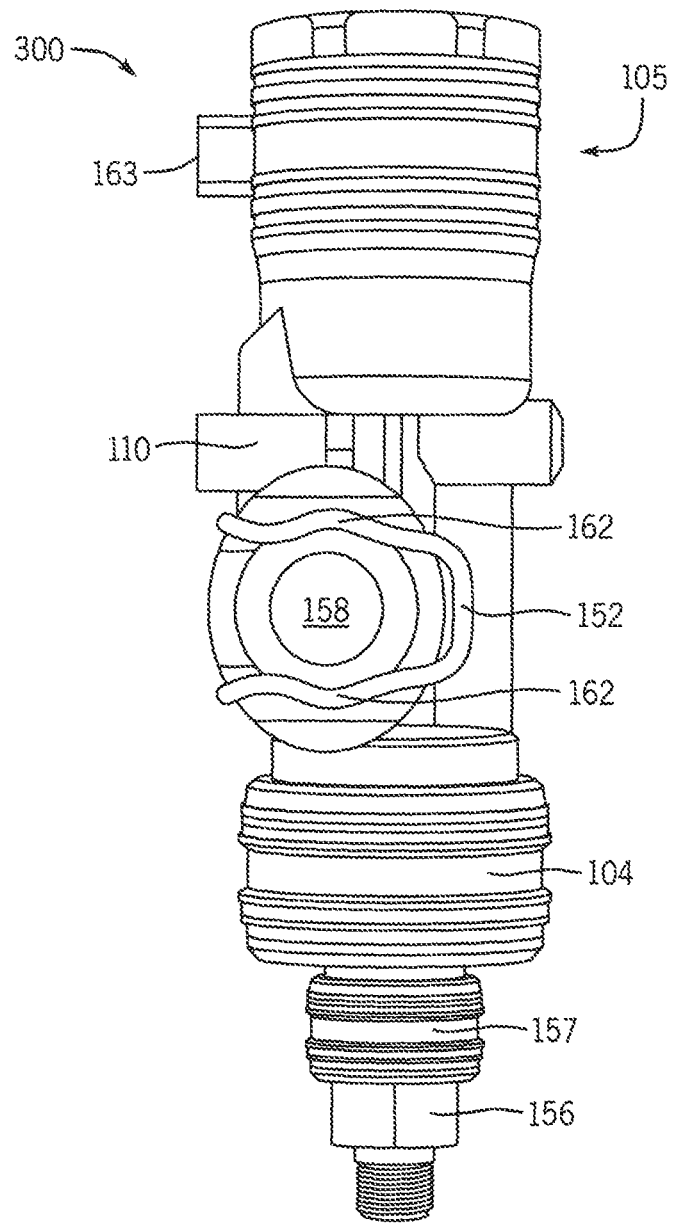
FIG. 7 is a schematic illustration of a cross-section of the manifold of FIG. 1 showing the interior details of a coupling between two modular manifold sections.

FIG. 6 illustrates a cross-section of the manifold assembly 300 and each coupling mechanism 104 of FIGS. 3-5 through a common fluid channel 158 of the manifold assembly. As shown, the manifold sections 102a, 102b may be joined such that the manifold assembly 300 defines one common motive fluid inlet 111, a common fluid channel 158, two integral valves 105, and two outlets. Via the common fluid channel 158, motive fluid may flow from the first manifold section 102a to the next manifold section 102b. Accordingly, the common fluid channel 158 fluidly couples the manifold sections 102a, 102b. Each manifold section 102a, 102b may define a dispensing fluid outlet 141 connecting the common fluid channel 158 to the outlet passageway 130 defined by each manifold section. Such fluid outlets may be opened and closed independently within independently controlled manifolds.

As shown in FIG. 6, the inlet connector 112b of the right manifold 102b may be received by a portion of the common fluid channel 158 defined, at least in part, by the left manifold 102a, e.g., the connector branch 115a of the manifold 102a. This modularity and ease of assembly may facilitate many variations of a common manifold system. This modularity also allows a manifold assembly to be easily expanded to accommodate additional manifold sections and/or outlets. To facilitate expansion, each inlet connector 112, as well as the end cap 113, may be configured to be easy to assemble and easy to remove. As shown, one or more sealing rings 160, e.g., O-rings, may be included in each manifold 102a, 102b. The sealing rings 160 may seal adjacent manifold sections, such as manifolds 102a, 102b. For example, the sealing rings 160 positioned between manifolds 102a, 102b may be included in a circumferential exterior portion of the inlet connector 112b and/or a circumferential interior portion of the manifold body, such as the inlet branch 114b. Multiple sealing rings may be included to seal each successive manifold section included in the manifold assembly 300. Near the sealing rings 160 of coupled manifolds and manifolds coupled to end caps 113, a band 131 may be included. The band 131 may be adjacent to each locking member, e.g., spring clip, included in the modular assembly, such as the connector locking member 152 and the end cap locking member 117.

As further shown in FIG. 6, a portion of the large eductor 154 is visible. The smaller eductor 156, coupled to the adapter 157, is not visible in this cross-sectional plane.

FIG. 7 illustrates a cross-section of the coupling between manifolds 102a, 102b shown in FIGS. 3-6, illustrating the interior details of the modular connection. The manifold coupling may facilitate the ease of assembly and modularity of the manifold assemblies of the present disclosure. The manifold coupling shown in FIG. 7 includes a connector locking member 152, which in this embodiment is a spring clip. As shown, the spring clip 152 may be U-shaped with each arm of the U including an outwardly protruding arc 162. When coupling the manifold 102 to an inlet connector 112, the arms of the connector spring clip 152 may slide into one or more passages, apertures or grooves defined by the manifold 102, and the outwardly protruding arc 162 of the connector spring clip 152 may couple to an external circumference of the inlet connector 112. When coupling the manifold to an adjacent manifold section, the arms of the connector spring clip 152 may slide into a passage defined by a first manifold, and the outwardly protruding arc of the spring clip may couple to an external circumference of the second manifold. When in a coupled position, an internal circumference of the outwardly protruding arc 162 may be similar to that of a portion of an external circumference of the manifold housing where the coupling is configured to occur, e.g., at a circumference of the manifold housing.

FIG. 7 also shows a cross section of the common fluid channel 158. As shown, the common fluid channel 158 is arranged transverse to the axis between the integrated valve 105 and the eductor 156. The connector spring clip 152, along with its receiving passages, may be arranged around the exterior perimeter of the common fluid channel 158 to avoid interfering with the stream of motive fluid passing therethrough. The extension of the mounting feet 110 laterally away from the manifold 102b is also visible, as is an electrical connector 163 that connects the integrated valve 105 to an electrical outlet.

Figure 8:
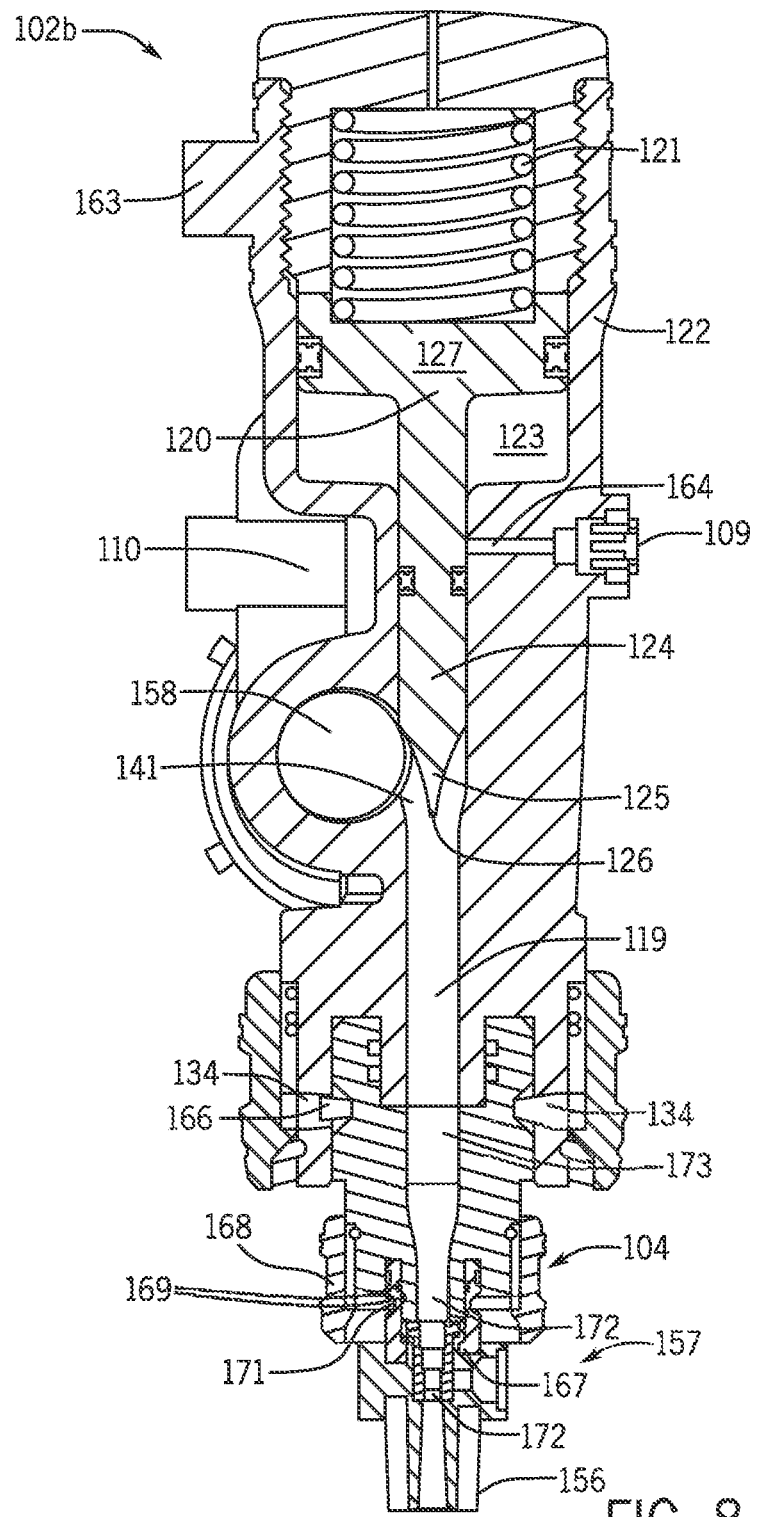
FIG. 8 is a schematic illustration of a cross-section of the manifold of FIG. 1 with a small eductor joined thereto and showing the interior details of the manifold.

FIG. 8 shows a cross-sectional view of the manifold 102b coupled to the small eductor 156 shown in FIG. 5. This cross-sectional view is taken along a plane perpendicular to that depicted in FIG. 2. As further shown, an integral air passageway 164 may extend from the rear portion of the air inlet 109, which includes a half cartridge configuration external air pressure port in the embodiment shown. Through the integral air passageway 164, air may enter the air fill space 123, thus increasing the air pressure within the plunger housing 122 to a magnitude sufficient to overcome the spring force of the plunger spring 121, thereby effecting movement of the plunger 120 against the spring 121. Various air pressure ports may be used in different embodiments. In some examples, the port may be configured for attachment to an airline, commonly via threads, or in the embodiments shown in FIGS. 1-5, a push-to-connect fitting. The push-to-connect fitting in this embodiment is a half cartridge push-to-connect. A half cartridge push-to-connect means that the manifold is used to form the outer housing of the push-to-connect fitting. Therefore, the integral components of the manifold may include components of the push-to-connect air fitting and may define a sealing surface between the push-to-connect fitting and an air passage integral to the manifold.

A cross-sectional view of the integrally formed common fluid channel 158 is also shown in FIG. 8. The common fluid channel 158 has a circular cross-sectional shape in this example, but other shapes may be defined. The size of the common fluid channel, both absolute and relative to other components of the manifold, may also vary in different embodiments. For example, embodiments in which multiple manifold sections are joined together may necessitate common fluid channels with a greater cross sectional area so that the manifold sections furthest from the motive fluid inlet may receive an adequate amount of motive fluid at an adequate pressure.

As further shown, the common fluid channel 158 may be offset from the vertical axis taken along the plunger arm 124. To allow fluid to selectively escape the common fluid channel 158 and enter the outlet passageway 130 for eventual mixing with chemicals received via the eductor, the manifold 102b defines at least one dispensing fluid outlet 141. The dispensing fluid outlet 141 defines the connection between the common fluid channel 158 and the outlet passageway 130 of the manifold 102b. The selective flow of motive fluid through the dispensing fluid outlet 141 is controlled by the integrated valve 105. As described herein, motive fluid can only pass through the dispensing fluid outlet 141 via the opening defined by the plunger seat 126. When the integrated valve 105 is in a closed position, the plunger tip 125 plugs this opening defined by the plunger seat 126, thereby preventing the flow of motive fluid from the common fluid channel 158 into the outlet passageway 130. As shown, in embodiments, the plunger seat 126 may extend across the entire lateral width of the outlet passageway 130. Only by moving the plunger 120 upward, against the force of the plunger spring 121, upon the injection of pressurized air via the inlet 109, is the plunger tip 125 removed from the plunger seat 126, thus allowing motive fluid to exit the common fluid channel 158, flow through the dispensing fluid outlet 141, and enter the outlet passageway 130.

FIG. 8 also provides another vantage point of the coupling mechanism 104 of the manifold 102b, as well as the adapter 157. As shown, the coupling mechanism 104 of the manifold is coupled with the adapter 157. The jaws 134 of the coupling mechanism 104 protrude into a complementary, circumferential recess 166 defined by the adapter 157, the top portion of which may resemble an eductor, such as the eductor 103 shown in FIG. 2. The adapter 157 may also include one or more components resembling the coupling mechanism 104, albeit at a smaller scale in this embodiment. For instance, the adapter 157 may include an integrally formed collar 167, an adapter sleeve 168, and one or more adapter jaws 169, the jaws configured to mate with a circumferential recess 171 defined by the small eductor 156. The adapter 157 may also include an adapter nozzle 172, from which motive fluid may be ejected from the adapter into the small eductor 156 for mixing and eventual emission. The adapter outlet passageway 173 is also shown. When coupled with both the eductor 156 and the coupling mechanism 104, the adapter outlet passageway 173 connects the outlet passageway 130 of the manifold 102 to the eductor 156. Since the eductor 156 shown in FIG. 8 is smaller than the eductor 103 shown in FIG. 1, for example, the diameter of the outlet passageway 173 narrows in closer proximity to the eductor 156. Accordingly, the velocity of the motive fluid may increase as the motive fluid passes through the adapter outlet passageway 173, thus lowering the pressure therein.

Figure 9:
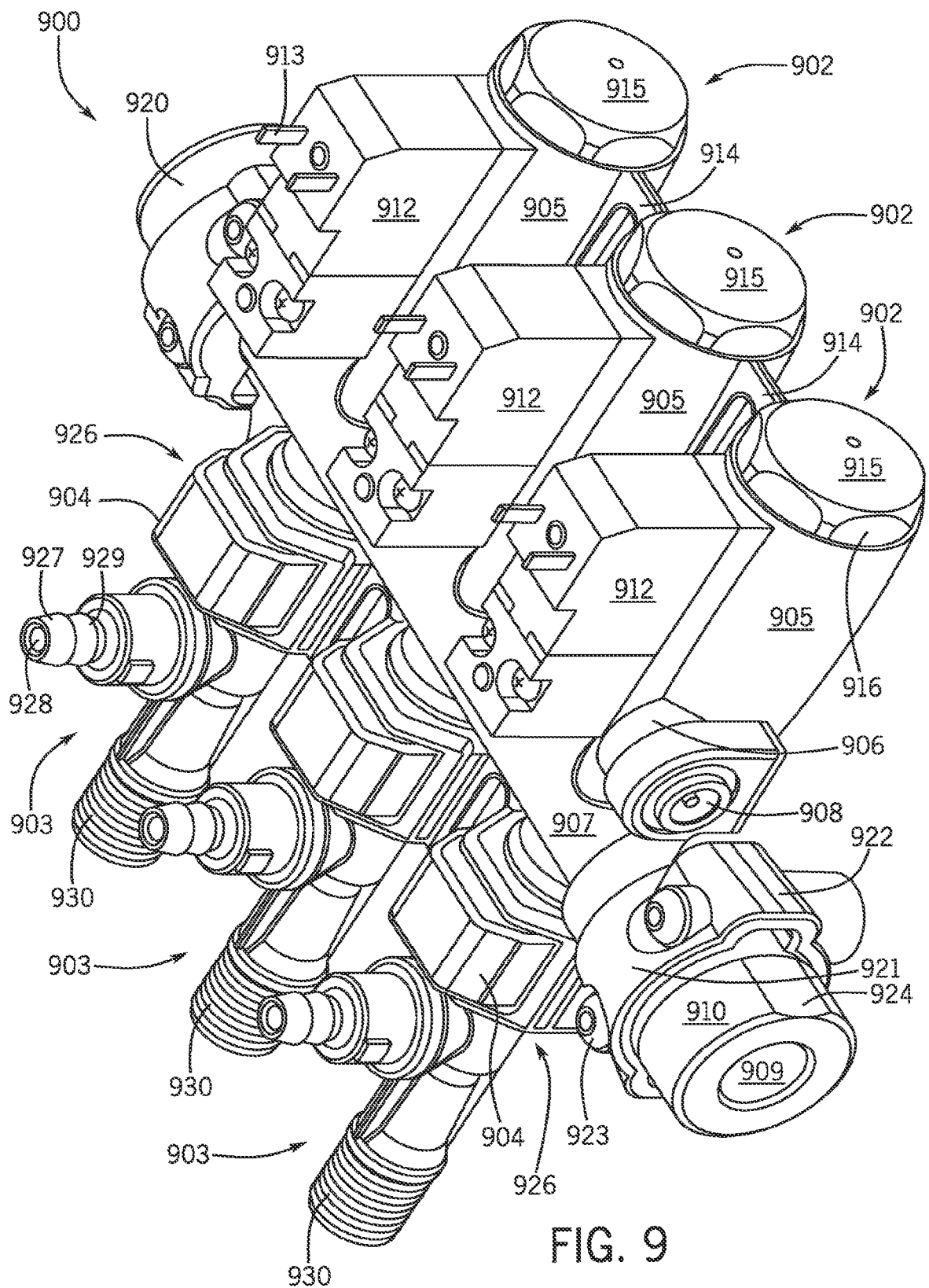
FIG. 9 is a schematic illustration of a perspective view of an integrated manifold assembly defining a single inlet and three outlets, with a chemical eductor attached to each outlet, according to certain implementations.

FIG. 9 shows an integrated manifold assembly 900 that includes three integrally formed manifold sections 902. As such, the manifold sections 902 may not be removably connected or coupled, but rather inseparably combined to form the manifold assembly 900. Each manifold section 902 is shown coupled with an eductor 903 via a latch member 904. Each manifold section 902 includes an integrated valve 905. An integrated air channel 906 and a common fluid channel 907 extend between the three manifold sections 902. In operation, pressurized air may be injected into the air channel 906 via at least one air pressure port 908. A motive fluid may be simultaneously injected into the common fluid channel 907 via a motive fluid inlet 909, for instance, defined by an inlet plug 910. Each integrated valve 905 may be formed with or coupled to one solenoid valve 912, which includes electrical connectors 913 configured for insertion into complementary electrical outlets. Collectively, the components of the manifold assembly 900 may operate as a unitary fluid delivery system configured to simultaneously emit multiple different fluid mixtures.

The integrated valves 905 formed with the integrated manifold assembly 900 may be air valves. As such, the integrated valves 905 may open and close in response to pressurized air flowing through the integrated air channel 906. For example, the input of pressurized air into the channel 906 may cause one or more integrated valves 905 to open internally upon actuation of one or more respective solenoid valves 912. Upon actuation, the integrated valve(s) 905 may open and a portion of the motive fluid passing through the common fluid channel 907 may be redirected into one or more eductors 903 shown in FIG. 9.

The number and configuration of the integrated valves 905 may vary. As shown in FIG. 9, an integrally-formed mounting structure 914 may span the space between each integrated valve 905. In some examples, the mounting structure 914 may include or define one or more additional structures used to mount the manifold assembly 900 to a surface, such as a wall. As further shown, a spring cap 915 may enclose an end of each valve 905. Each spring cap 915 may include a plurality of cap indents 916 to facilitate user handling, e.g., improve hand grip or tool mating. Each solenoid valve 912 coupled with each integrated valve 905 may contain an electrical coil. Together, the solenoid valves 912 and integrated valves 905 may operate cooperatively to drive movement of the plunger 918. To enable actuation of the solenoid valves 912, electrical connectors 913 may protrude from an external surface thereof. The solenoid valves 912 may be operated by an external controller, e.g., a computer.

An air pressure port 908 may be included at one or more ends of the integrated manifold assembly 900. In some examples, such as that shown, the air pressure port 908 may define a push-to-connect fitting, such as the push-to-connect fitting of the port defining the air inlet 122 shown in FIG. 8. An external airline connected to the port 908 may inject pressurized air into the common air channel 906. The common air channel 906 may extend laterally across all of the manifold sections 902 included in the manifold assembly 900, such that each integrated valve 905 is fluidly coupled with the common air channel 906. In the example shown in FIG. 9, the air channel 906 is positioned above the common fluid channel 907, such that the air channel 906 runs parallel to the fluid channel 907. In some examples, the relative positioning of the common air conduit and the common fluid conduit 907 may vary.

As further shown in FIG. 9, the common fluid channel 907 may be integrally formed with the manifold assembly 900. The common fluid channel 907 may include a fluid inlet plug 910 at one or both ends. Embodiments including an inlet plug 910 at both ends may be closed at one end by an end cap, such as end cap 920 shown in FIG. 9. To couple the inlet plug 910 with the common fluid channel 907, an inlet connecting segment 921 may be formed with or coupled to the manifold assembly 900. The connecting segment 921 may serve as an adapter, which may vary in size and/or shape in some examples. Generally, the cross-sectional shape of the connecting segment 921 may resemble the cross-sectional shape of the portion of the inlet plug 910 that mates with the connecting segment 921. As shown, however, the connecting segment 921 may define one or more protruding portions 922. Such portions 922 may define one or more apertures each configured to receive a fastener 923. The fasteners 923 may pass through an additional aperture integrally defined within the manifold body, thus securing the connecting segment 921 to the manifold assembly 900. In some embodiments, the protruding portions 922 may also be used to couple the fluid inlet plug 910 with the connecting segment 921 in a proper orientation. As further shown, the inlet plug 910 may define one or more indents 924. Such indents 924 may facilitate user handling, similar to the indented portions 916 defined by the end caps 915. The indents 924 may also provide substantially flat surfaces configured to bear against the each fastener 923 secured to the connecting segment 921.

One or more eductors 903 may be coupled with the manifold assembly 900, with each eductor 903 coupled directly to one manifold section 902. Each eductor 903 may be sealingly coupled with a manifold section 902. In some examples, each eductor 903 may be threadably coupled to an internal port defined by each manifold section 902. Each eductor 903 may be coupled with the manifold assembly 900 via a latch member coupling mechanism 926, which includes a latch member 904 that may be slidably inserted into a latch member receiving space such that each arm of the latch member 904 is positioned within a locking bore.

Each eductor 903 may define or be coupled with an injection housing 927. The injection housing 927 may further define a chemical inlet 928 and a barbed fitting 929. The barbed fitting 929 may be configured for attachment to conventional chemical supply tubing and/or piping. After securing such tubing and/or piping to the barbed fitting 929, a concentrated chemical, gas, or other concentrated input may be injected into the injection housing 927 of the eductor 903. For consistency, a "chemical" input is again referenced with respect to the features described herein. After injection, the chemicals may mix with a motive fluid passing through each eductor 903. In the arrangement shown in FIG. 9, the concentrated input and motive fluid may converge at a perpendicular angle within eductor 903, where the two fluids are mixed. After mixing, the diluted fluid may be emitted from the eductor 903 through a threaded outlet 930, shown in FIG. 9 at a bottom end of the eductor 903. In some examples, each eductor 903 may be coupled to a different supply source, such that each eductor receives a different chemical for mixing.

Figure 10:
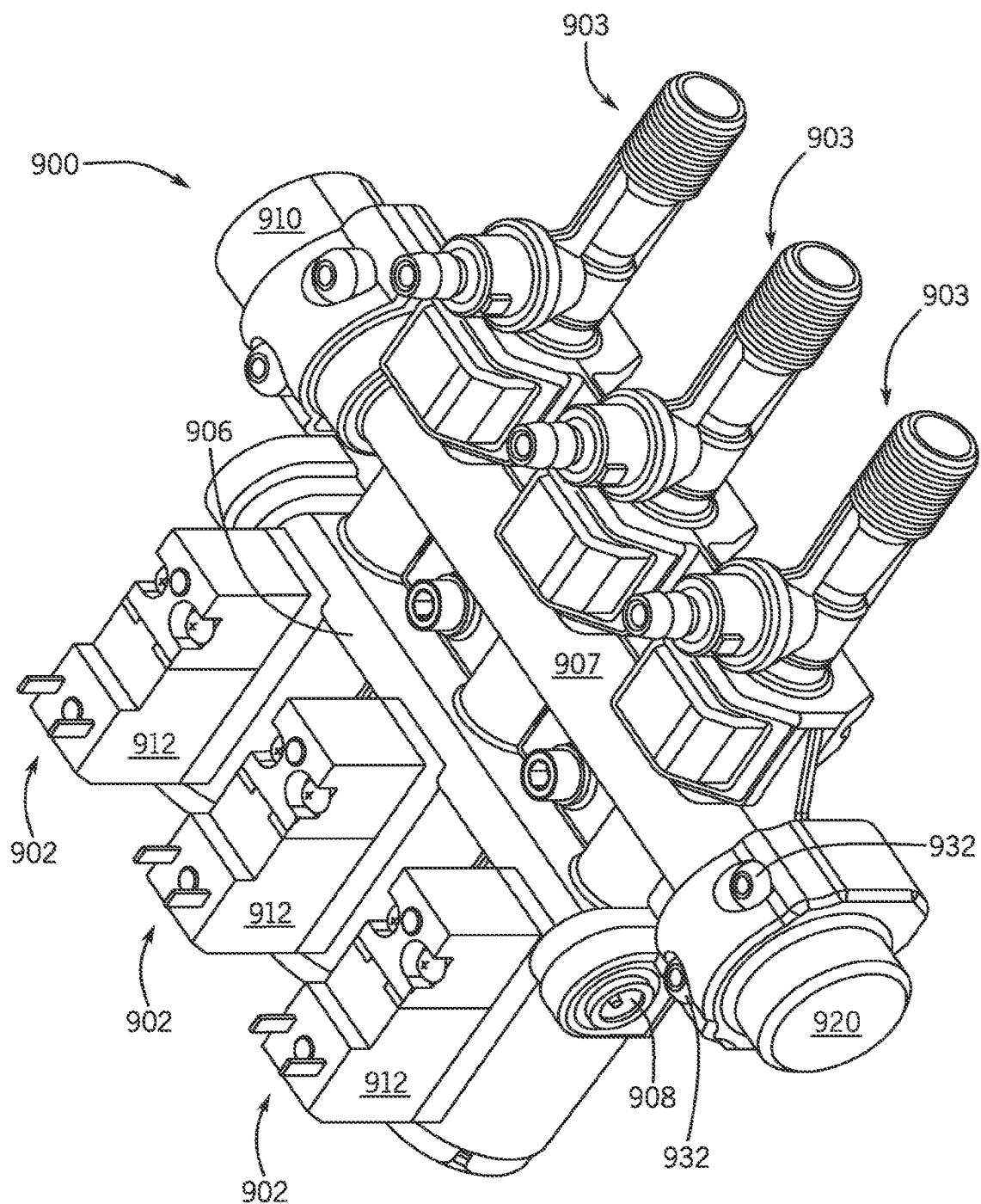
FIG. 10 is a schematic illustration of another perspective view of the integrated manifold assembly of FIG. 9.

FIG. 10 shows another view of the integrated manifold assembly 900 illustrated in FIG. 9. The perspective shown in FIG. 10 depicts the manifold cap 920 coupled with the manifold assembly 900 at an end of the common fluid channel 907 opposite the motive fluid inlet 909. Two manifold cap fasteners 932 are also shown coupled with the manifold cap 920. The manifold cap fasteners 932 may be received by complementary-shaped apertures integrally formed with the manifold assembly 900, thus coupling the manifold cap 920 to the manifold assembly 900. As further shown, an air pressure port 908 is also included at a second end of the common air channel 906.

Figure 11:
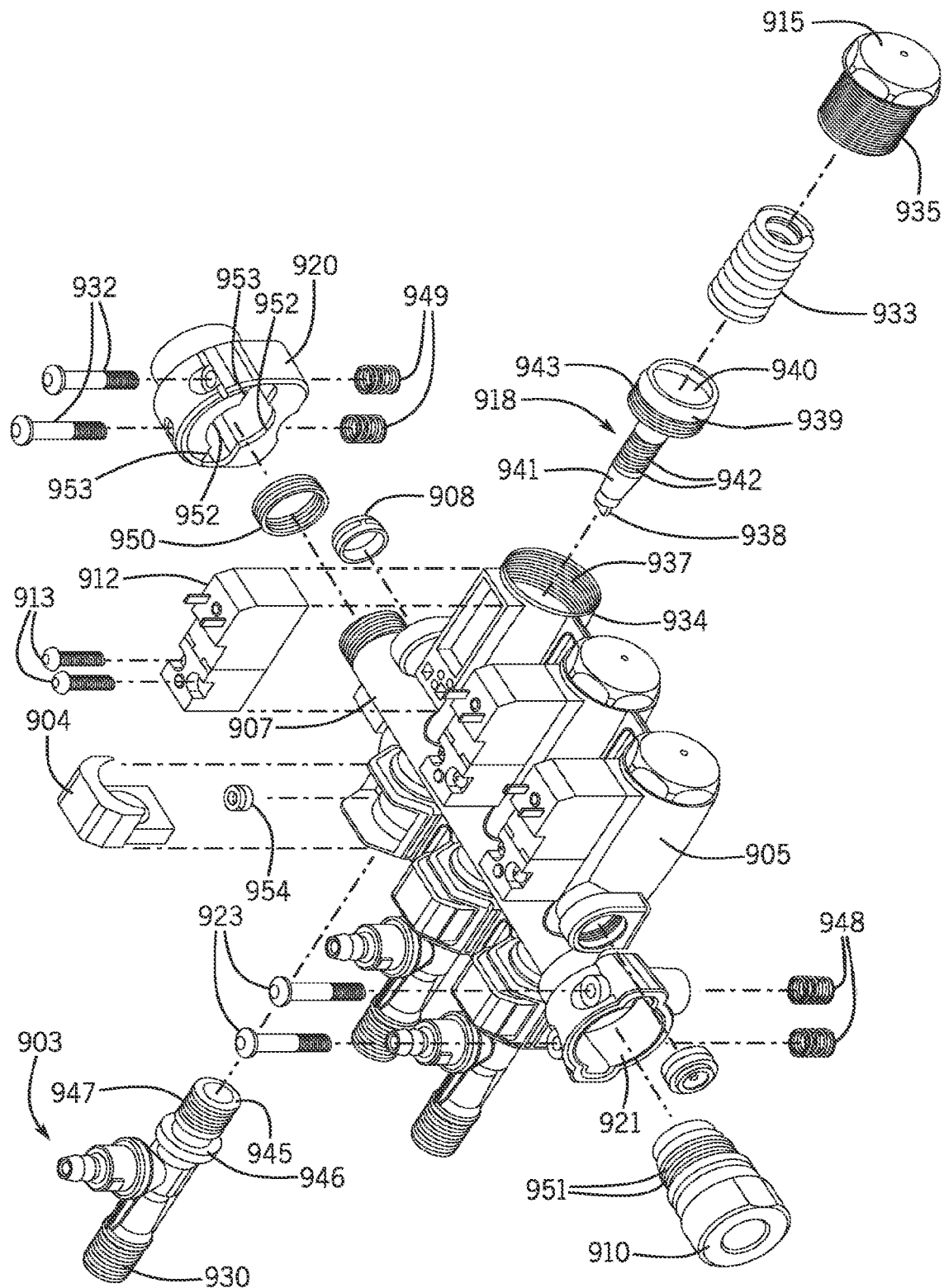
FIG. 11 is a schematic illustration of an exploded component view of the integrated manifold assembly in the orientation shown in FIG. 9.

FIG. 11 is a schematic illustration of an exploded component view of the integrated manifold assembly 900 in the orientation shown in FIG. 9. The exploded view shown in FIG. 11 illustrates components of the integrated assembly 900 that may be non-integrated in some examples. As such, the components shown separated from the body of the assembly 900 may be attached, secured, or otherwise coupled thereto. The plunger 918 and plunger spring 933 may be included within each integrated valve 905. These two components, among others, may be enclosed within a plunger housing 934, such that the components are concealed therein, with a spring cap 915 coupled to the end of each housing. As shown, the spring cap 915 may define a circumferential spring cap threaded portion 935 to facilitate coupling the end cap with an interior threaded portion 937 of each plunger housing 934. The plunger 918 may define a tip portion 938 at one end and a plunger head 939 at the opposite end. The plunger head 939 may define a circular plunger spring receiving space 940 configured to receive an end of the plunger spring 933. An elongate plunger arm 941 may extend between the plunger tip 938 and the plunger head 939. Along the arm 941, the plunger may include one or more plunger arm O-rings 942 disposed within radial grooves. The plunger arm O-rings 942 may separate the fluid-filled interior compartments of the manifold assembly 900 from the air-filled compartments. As described in greater detail, each integrated valve 905 may be sealed off from any fluid contact, such that the plunger head 939, plunger spring 933, and spring cap 915 each remain dry during operation of the manifold assembly 900. The plunger 918 may further include one or more plunger head O-rings 943 circumferentially surrounding the exterior of the plunger head 939. The plunger head O-rings 943 may seal against a circumferential interior portion of the plunger housing 934 such that such that air pressure does not escape the integrated valve 905.

FIG. 11 also illustrates additional details of the portion of each eductor 903 configured to couple with each manifold section 902. For example, opposite the threaded outlet 930, each eductor 903 may define a tapered leading edge 945. The tapered configuration of the leading edge 945 may facilitate slidable insertion of the eductor 903 into the receiving space defined by the manifold assembly 900. As further shown, the eductor 903 may also define a radial sealing groove 946 proximate to the leading edge 945. In some examples, at least one eductor O-ring 947 may be inserted within the sealing groove 946 to seal against an interior surface of a collar portion defined by each manifold section 902.

At the inlet plug connecting segment 921 and the manifold cap 920, one or more fastener components 948, 949 may be coupled with their respective fasteners 923, 932. One or more manifold cap O-rings 950 may be positioned between an interior surface of the manifold cap 920 and a circumferential portion of the common fluid channel 907. At the opposite end of the common fluid channel 907, the inlet plug 910 may include one or more inlet plug O-rings 951 disposed within radial grooves. The inlet plug O-rings 951 may also sealingly engage with an internal, circumferential portion of the common fluid channel 907.

The manifold cap 920 may define a cross-sectional shape configured to mate with the integrated manifold assembly 900 without interfering with the cross-sectional shape of the common fluid channel 907. In particular, the cross-sectional shape of the manifold cap may define two centrally-disposed semi-circle segments 952 flanked by straight segments 953. The semi-circular segments 952 may be identical in shape to the circular perimeter defining the common fluid channel 907. The straight segments 953 may mate with integral portions of the manifold assembly 900 surrounding the common fluid channel. Accordingly, the manifold cap 920 may require proper orientation by a user with respect to the integrated manifold assembly 900 for coupling. In alternative implementations, the manifold cap 920, plug connecting segment 921 and connecting portions of the integrated manifold assembly 900 may be configured to mate via multiple orientations and may be secured using a variety of fastener components and fasteners.

Each latch member 904 of the integrated manifold assembly 900 may be positioned to engage with a latch spring 954 arranged between the latch member 904 and the latch coupling mechanism 926. To reversibly couple each eductor 903 to the manifold assembly 900 via the latch coupling mechanism 926, the latch spring 954 may be compressed and released by a user.

As further shown in FIG. 11, each solenoid valve 912 may be secured to the manifold assembly 900 via one or more solenoid fasteners 913. In embodiments, the fasteners 913 may include screws, bolts, pins, or the like.

Figure 12:
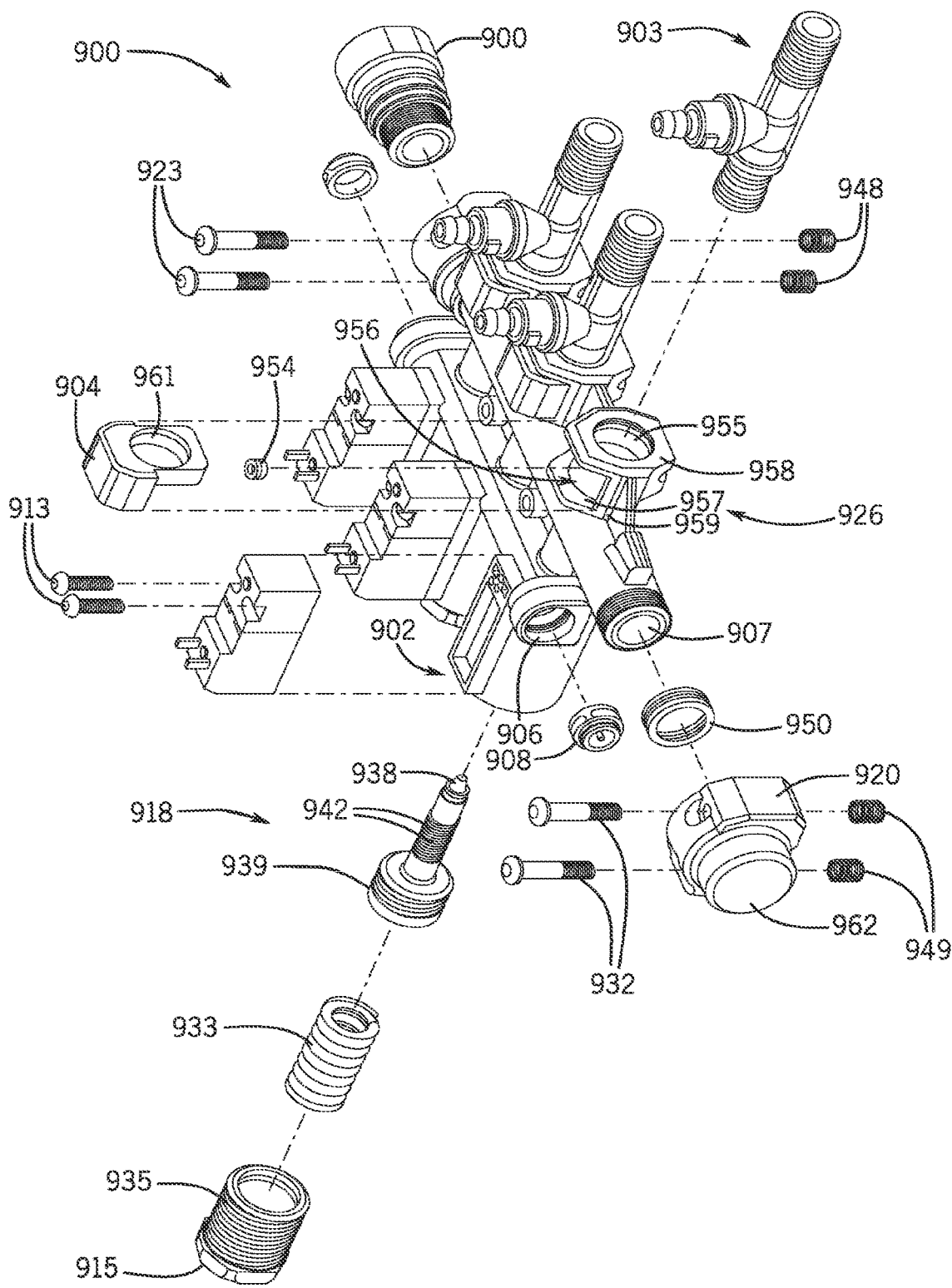
FIG. 12 is a schematic illustration of an exploded component view of the integrated manifold assembly in the orientation shown in FIG. 10.

FIG. 12 shows an exploded component view of the integrated manifold assembly 900, in the orientation shown in FIG. 10. Among other things, the integrally formed latch coupling mechanism 926 defined by each manifold section 902 is shown. The latch coupling mechanism 926 defines a port for each eductor 903 and a receiving space for each latch member 904. In particular, the latch coupling mechanism 926 may define an eductor receiving portion 955 and a latch member receiving portion 956. As shown, the latch member receiving portion 956 may be oriented transverse to the eductor receiving portion 955. The latch coupling mechanism 926 may include opposing walls 957, 958. The proximal wall 957 is positioned nearest the common fluid channel 907 of the manifold assembly 900, and the distal wall 958 is offset a distance from the body of the manifold assembly 900. At least one longitudinally extending wall 959 may connect the proximal wall 957 to the distal wall 958. A circumferential gap between a surface of a latch collar 960 defined by the latch coupling mechanism 926 and an internal surface of each of the proximal wall 957 and distal wall 958 may define the latch member receiving portion 956. The internal aperture defined by the distal wall 958 serves as the eductor receiving portion 955 in this embodiment. As further shown, the latch member 904 also defines an eductor aperture 961 configured to receive the eductor 903.

In operation, the latch member 904 may be slidably inserted into the latch member receiving space 956 prior to coupling the eductor 903 with the latch member coupling mechanism 926. The latch member 904 may be inserted into the latch member receiving portion 956 such that the eductor aperture 961 and the eductor receiving portion 955 align. In some examples, the eductor 903 may not be receivable by the latch coupling mechanism 926 until the eductor aperture 961 is aligned with the eductor receiving portion 955.

FIG. 12 also shows the common fluid channel 907 and the common air channel 906. As shown, the air inlet 908, which may be a half-cartridge configuration, may be partially inserted into the opening of the common air channel 906. The manifold cap 920 may define a protruding knob 962 for grasping by a user.

Figure 13:
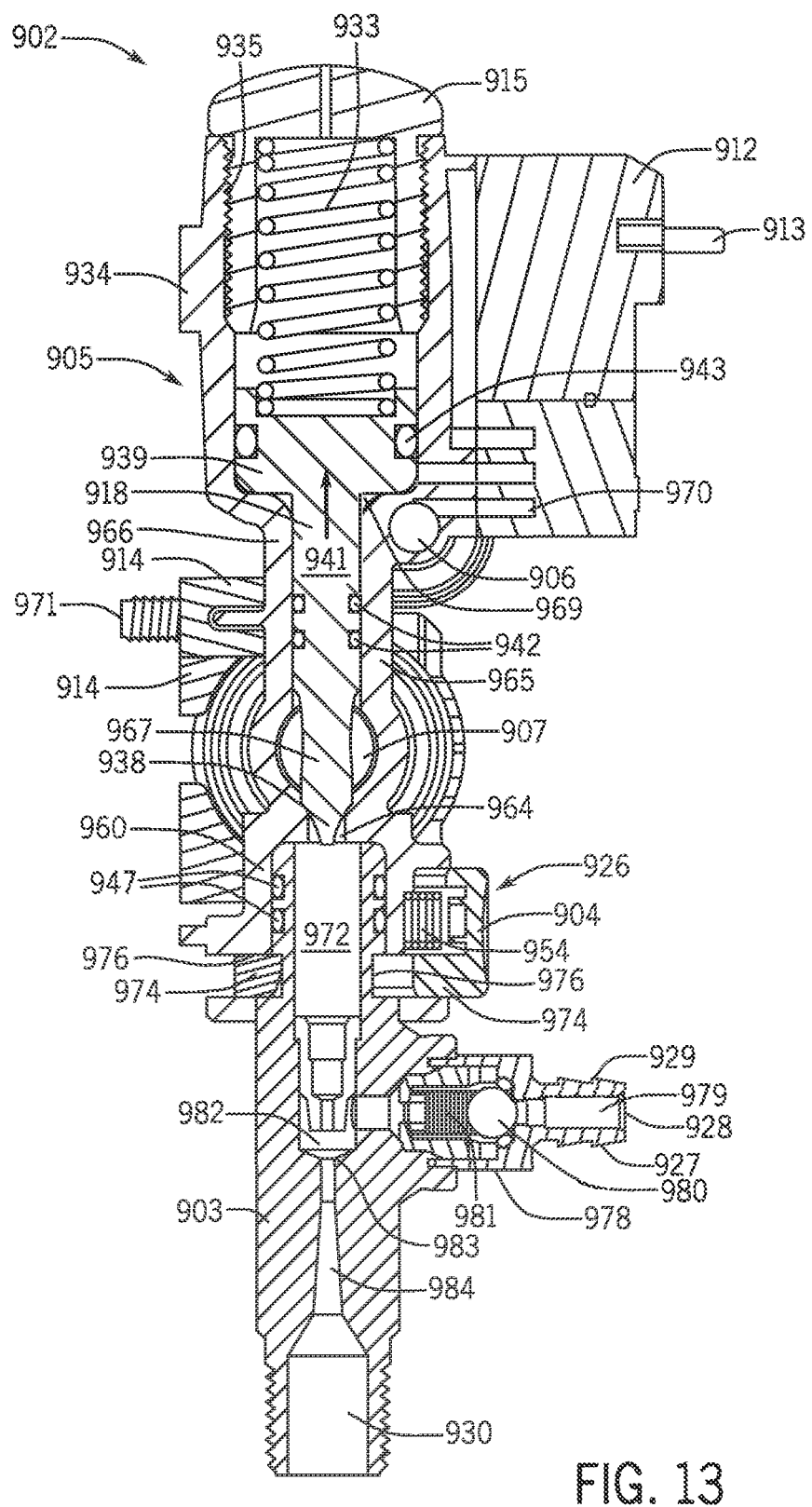
FIG. 13 is a schematic illustration of a side cross-section of the integrated manifold assembly of FIG. 9.

FIG. 13 is a side cross-section of the integrated manifold assembly 900, showing the interior of one manifold section 902. As shown, each manifold section 902 may define a portion of the integrally constructed common fluid channel 907, common air channel 906 and mounting structure 914. Each manifold section 902 may also define an integrally constructed fluid outlet 964, plunger housing 934 and latch member coupling mechanism 926. An eductor 926 may be coupled to each manifold section 902 via the latch member coupling mechanism 926, and a solenoid valve 912 may be coupled with each manifold section 902 at an external face of the plunger housing 934.

As shown in FIG. 13, the plunger housing 934 of the integrated valve 905 may be formed integrally with each manifold section 902. The plunger 918 may be enclosed within the plunger housing 934, and the plunger 918 may define a plunger head 939, which may be positioned in direct contact, or at least coupled with, the plunger spring 933. Similar to the plunger 126 shown in FIG. 2, the plunger 918 may define an elongate plunger arm 941 that extends into the common fluid channel 907. Accordingly, the plunger housing 934 may define an integral plunger arm receiving portion 965 that encloses the plunger arm 941. The plunger arm receiving portion 965 may define a first plunger arm receiving portion 966 configured to couple with the common air channel 906, and a second plunger arm receiving portion 967 configured to couple with the common fluid channel 907. In particular, the distal end of the second plunger arm receiving portion 967 (relative to the plunger spring 933) may be fluidly coupled to the common fluid channel 907. Because the plunger housing 934 may be coupled with the common air channel 906, air flow through the common air channel 906 may flow into the air fill space 969 of the plunger housing 934 via the air conduit 970. Injection of air into the air fill space 969 may cause the plunger 918 to move against the force of the plunger spring 933 in the direction of the arrow. Movement of the plunger 918 in this direction may lift the plunger tip 938 such that the plunger tip 938 is removed from the fluid outlet 964, e.g., the tip 938 unplugs the outlet. Because the outlet 964 connects the common fluid channel 907 to the eductor outlet passageway 972, once uncovered, the fluid outlet 964 may allow a motive fluid to escape from the common fluid channel 907 into each eductor outlet passageway 972.

As shown, a portion of the eductor 903 may be positioned adjacent to the fluid outlet 964 defined by the manifold assembly 900. In other embodiments, a manifold assembly may define or include a protruding nozzle that may extend within a receiving area defined by the eductor, similar to the manifold outlet nozzle 146 illustrated in FIG. 2.

The separation of air and fluid inputs within each manifold section 902 may be necessary for the operation of each manifold section and the integrated manifold assembly 900 as a whole. In particular, air received at the air inlet 908 may flow into the common air channel 906 and the air fill space 969 of the plunger housing 934 without mixing with the fluid passing through the common fluid channel 907. As shown in FIG. 13, the plunger arm 941 may be in contact with both the pressurized air received via the inlet 908 and the motive fluid passing through the common fluid channel 907. To ensure complete separation of the air and the fluid, the plunger arm receiving portion 965 may be configured to sealingly engage with the plunger arm 941. The sealing mechanism may vary in different embodiments. As shown in FIG. 13, for example, the plunger arm 941 may include one or more plunger arm O-rings 942. Two plunger arm O-rings 942 are shown, but embodiments may include fewer or more. The position of the O-rings 942 may also vary, provided they are positioned between the common fluid channel 907 and the common air channel 906. Different positioning of one or more plunger arm O-rings 942 may reflect changes to the shape or positioning of the plunger arm 941 itself. For instance, the plunger arm 941 shown in FIG. 13 defines parallel, longitudinally extending sides that near the common fluid channel 907, taper toward each other and away from the internal surfaces of the second portion of the plunger arm receiving portion 967. Because fluid from the common fluid channel 907 may occupy the lateral space between the plunger arm 941 and the second portion of the plunger arm receiving portion 967, the plunger arm O-rings 942 may be critical to preventing fluid from seeping toward the air fill space 969. In some examples, the O-rings separating the fluid compartments from the air compartments of each manifold section 902 may be included in the plunger housing 934 in addition to or instead of the plunger arm 941.

As further shown in FIG. 13, the plunger housing 934 may define a housing portion configured to receive and couple with the spring cap 915. The spring cap 915 may define an external threaded portion 935 configured to mate with an interior threaded portion 937 defined by the plunger housing 934. As such, the spring cap 915 may be rotationally screwed onto the plunger housing 934. By coupling the spring cap 915 with the plunger housing 934, the plunger 918 and plunger spring 933 may be entirely enclosed, and the air fill space 969 may be air-tight. To seal the pressurized air within the air fill space 969, one or more plunger head O-rings 943 may be coupled within the plunger 920. In addition or alternatively, one or more O-rings may be coupled with the plunger housing 934. Sealing the components of the plunger housing 934 within an air-tight volume may ensure that pressurized air injected into the air fill space 969 will not leak therefrom. This may be important for effecting movement of the plunger 918 in a controlled fashion.

As further shown in FIG. 13, one or more fasteners 971 may be coupled with the integral mounting structure 914 defined by the manifold assembly 900. As shown, the integral mounting structure 914 may define one or more substantially flat surfaces configured to mate with a similarly flat surface.

FIG. 13 also shows the portions of the integrated manifold assembly 900 configured to couple with the eductor 903. As shown, an integrally formed collar 960 may be defined by the manifold assembly 900. The collar 960 may sealingly engage a portion of the eductor 903 via one or more eductor O-rings 947. In other embodiments, the each manifold section 902 may define a nozzle or similar feature, from which motive fluid may be emitted into the eductor. According to such implementations, the nozzle may extend into a receiving space defined by the eductor.

As further shown, the latch member coupling mechanism 926 may include the latch member 904 and the latch spring 954. In this example, the latch spring 954 is arranged between an exterior surface of the collar 960 and an interior surface of the latch member 904. The latch member 904 defines a radial insert 974 configured to circumferentially surround the eductor 903. The radial insert 974 may be defined by parallel chamfered surfaces. As shown, the eductor insert 974 may be configured to insert within a complementary radial receiving slot 976 defined by the eductor 903. The radial receiving slot 976 may protrude radially inward within the eductor 903, forming a groove. To operate the latch member coupling mechanism 926, a user may apply a perpendicular force to the exterior surface of the latch member 904. Applying such a force may push the latch member 904 toward the collar 960, thus compressing the latch spring 954 therebetween. In this position, the eductor aperture 961 may be aligned with the eductor receiving portion 955, enabling the eductor 903 to be receivable by the latch coupling mechanism 926. When the eductor 903 is present in the latch member coupling mechanism, compression of the latch spring 954 may urge the radial insert 974 out of the radial receiving slot 976, and the eductor 903 may be removed from the integrated manifold assembly 900. When the compression spring 954 is compressed, and once the eductor 903 is inserted into the eductor receiving portion 955, e.g., due to the alignment of the eductor aperture 961 and the eductor receiving portion 955, the latch member 904 is released, and the chamfered surfaces of the radial insert 974 of the latch member 904 may engage with the chamfered surfaces of the radial receiving slot 976 of the eductor 903 to reversibly mate, thus securing the eductor 903 to the manifold section 902 against the force of gravity, for example. The latch member 904 may be configured to lock in this position. Unlocking the latch member 904 may be accomplished by momentarily compressing the latch spring 954, after which the radial insert 974 may be released from the radial receiving slot 976. Once unlocked, the eductor 903 may be released. In some examples, the latch member 904 may be referred to as a "quick-release button."

The cross section of FIG. 13 also shows the components that may be included in the eductor 903. As shown, the eductor 903 may be an eductor assembly in some embodiments. The eductor 903 may include an injection housing 927 that defines a chemical inlet 928, a barbed fitting 929, a retention sleeve 978 and an eductor inlet passageway 979. The injection housing 927 may further include a check-ball 980 and an eductor spring 981. A mixing zone 982 may be positioned adjacent to a Venturi throat 983 in the body of the eductor 903.

In operation, motive fluid may exit the integrated manifold 900 and enter the eductor outlet passageway 972 defined by the body of the eductor 903. The motive fluid may then enter a mixing zone 982, where it is mixed with educted chemical received at the injection housing 927 via the chemical inlet 928. The mixture of motive fluid and chemical is then conducted out of the eductor 903 through a diverging flow path 984 and the eductor outlet 930.

Educted chemical may be input to the eductor inlet passageway 979 defined by the injection housing. A vacuum created in the Venturi throat 983 defined in the eductor body educts chemical, e.g., concentrated chemical, through the eductor inlet passageway 979. Suction from the Venturi throat 983 may overcome a spring force resulting from the eductor spring 981 and allows chemical to flow past the check-ball 980 and into the mixing zone 982 where the motive fluid and chemical are mixed.

The injection housing 927 shown in FIG. 13 is connected to the body of the eductor 903, but is not integrally formed therein. In some examples, the injection housing 927 may be an integral component of the eductor 903, such that the two components may not be separated. Various eductor types may be used according to the present disclosure.

Figure 14:
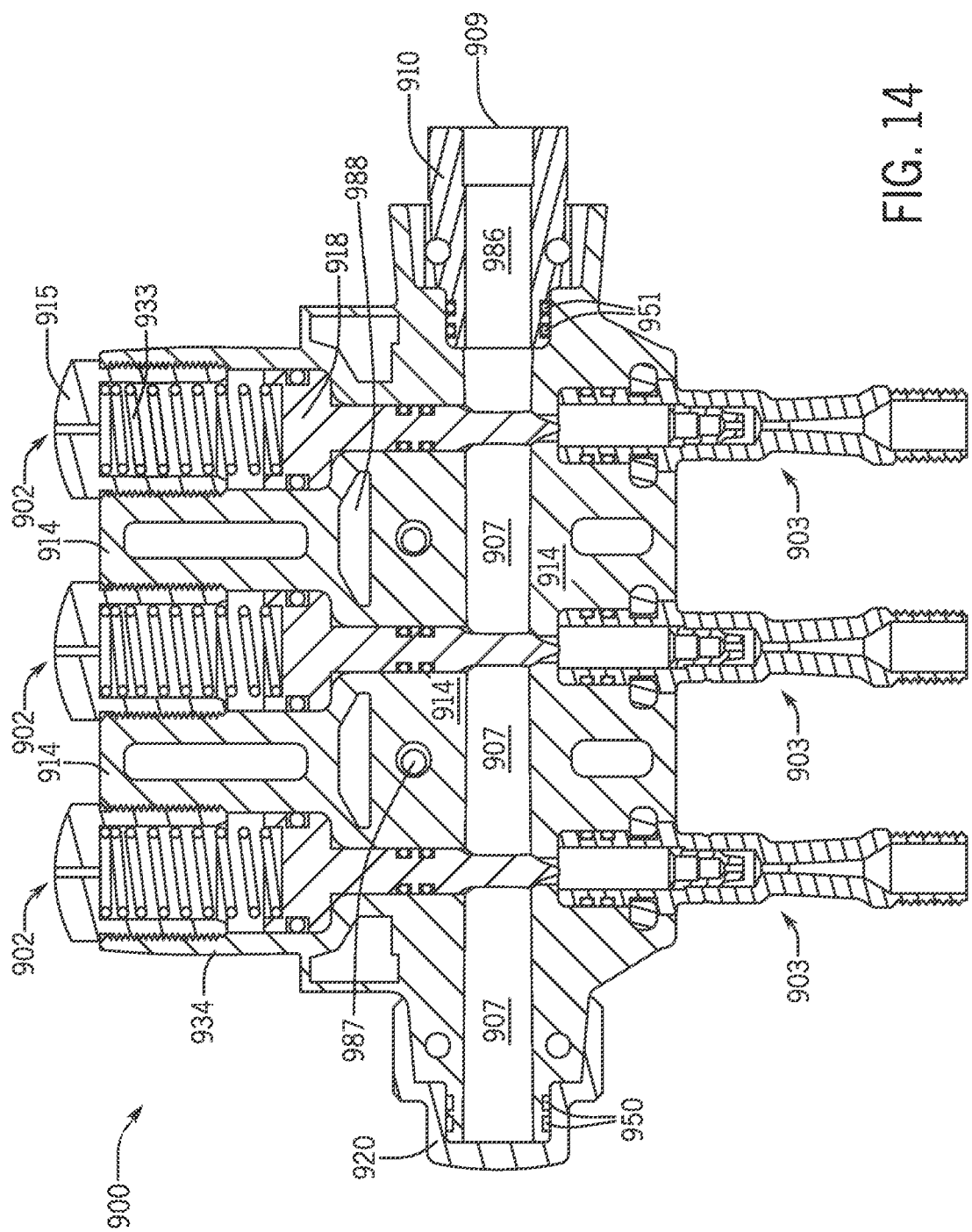
FIG. 14 is a schematic illustration of a front cross-section of the integrated manifold assembly of FIG. 9, taken along a plane through the common fluid channel defined by the integrated manifold assembly.

FIG. 14 shows a front cross-section of the integrated manifold assembly 900 of FIG. 9, taken along a plane through the common fluid channel 907 defined by the manifold assembly. The manifold sections 902 defined by the manifold assembly 900 are formed together in a common, integral construction. This unitary configuration may decrease the exposure of the manifold assembly components to the external environment and reduce the number of individual component parts required for assembly. The integrated manifold assembly 900 may also decrease the number of seals required to protect the assembly from the penetration or loss of fluids.

As shown, the common fluid channel 907 may extend laterally across the integrated manifold assembly 900. The manifold end cap 920 is shown on the left, capping the common fluid channel 907. One or more manifold cap O-rings 950 may be positioned between the manifold assembly 900 and internal surface of the manifold end cap 920, creating a seal between the two components. At the right end of the manifold assembly 900, opposite the manifold end cap 920, the inlet plug 910 is coupled with the manifold assembly 900. The inlet plug 910 defines the motive fluid inlet 909, where motive fluid may be received. The inlet plug 910 defines an internal plug inlet passageway 986. Once coupled with the integrated manifold assembly 900, the plug inlet passageway 986 aligns with the common fluid channel 907, such that motive fluid received at the fluid inlet 909 may flow into the common fluid channel 907, where it is accessible to each manifold section 902 included in the integrated manifold assembly 900 upon opening of the integrated valves 905. Two inlet plug O-rings 951 are positioned within radial grooves defined by the inlet plug 910. The inlet plug O-rings 951 may seal against a receiving surface of the integrated manifold assembly 900, preventing motive fluid from leaking from the common fluid channel 907.

The mounting structure 914 is integrally formed with the integrated manifold assembly 900. As shown, the mounting structure 914 may extend between each manifold section 902 both below and above the common fluid channel 907. Accordingly, each plunger housing 934 may be integrally formed with the adjacent plunger housing 934 through the mounting structure 914. The integral mounting structure 914 may define numerous apertures that may be variously sized, shaped, and positioned. For instance, at least one mounting aperture 987 may be defined by the mounting structure 914. As shown, the mounting aperture 987 may be approximately circular to accommodate a fastener, e.g., a screw or bolt. Additional gaps of irregular shape may also be defined by the mounting structure 914. For example, mounting gap 988 may be defined by the mounting structure 914. The inclusion of one or more gaps within the mounting structure 914 may decrease the weight of the integrated manifold assembly 900. Such gaps may also be used to accommodate various mounting fasteners and/or external protuberances that may facilitate mounting the integrated manifold assembly 900.

Although certain embodiments of the present disclosure are described herein with reference to the examples in the accompanying figures, it would be apparent to those skilled in the art that several modifications to the described embodiments, as well as other embodiments of the present invention are possible without departing from the spirit and scope of the present disclosure.

What is claimed is:

1. A manifold assembly for use with a fluid delivery system, comprising:
    a manifold body formed from a single piece of material and defining:
        a common fluid channel;
        a plurality of individual fluid outlets, each of the individual fluid outlets fluidically coupled to the fluid channel;
        a common air channel, the common air channel and the common fluid channel being non-fluidly coupled relative to each other; and
        a corresponding number of plunger housings to the plurality of individual fluid outlets, each of the plunger housings formed from the single piece of material and at least partially defining the common air channel,
    wherein each plunger housing of the corresponding number of plunger housings comprises a plunger arm receiving portion, the plunger arm receiving portion comprising a first plunger arm receiving portion configured to receive a plunger head and a second plunger arm receiving portion configured to receive an elongated stem of a plunger within the common fluid channel, wherein the second plunger arm receiving portion defines a portion of the common fluid channel.

2. The manifold assembly of claim 1, wherein the corresponding number of plunger housings collectively define the common air channel.

3. The manifold assembly of claim 1, wherein the corresponding number of plunger housings collectively define the common fluid channel.

4. The manifold assembly of claim 1, wherein the first plunger arm receiving portion defines a portion of the common air channel.

5. The manifold assembly of claim 1, wherein
    each plunger housing is configured to receive the plunger with the elongated stem in the common fluid channel, and
    each plunger is actuable using the common air channel.

6. The manifold assembly of claim 5, wherein each plunger housing is arranged with a respective individual fluid outlet of the plurality of fluid outlets such that, upon actuation of an associated plunger, fluid from the common fluid channel is caused to be released through the respective individual fluid outlet.

7. The manifold assembly of claim 1, wherein each fluid outlet of the plurality of individual fluid outlets is configured to seat a tip of the plunger and seal a respective fluid outlet from fluid passage with the tip is seated thereon.

8. A manifold assembly for use with a fluid delivery system, comprising:
- a manifold body formed from a single piece of material and defining a plurality of plunger housings, wherein the plurality of plunger housings collectively define
  - a common fluid channel of the manifold, and
  - a common air channel of the manifold, the common air channel and the common fluid channel being non-fluidly coupled relative to each other,
- wherein each plunger housing of the plurality of plunger housings comprises a plunger arm receiving portion configured to sealingly engage an elongated plunger,
- wherein the plunger arm receiving portion comprises a first plunger arm receiving portion that defines a portion of the common air channel.

9. The manifold assembly of claim 8, wherein each plunger housing defines an individual fluid outlet fluidly coupled with the common fluid channel.

10. The manifold assembly of claim 9, wherein the individual outlet is configured to receive a plunger tip of the elongated plunger for blocking flow from the individual outlet.

11. The manifold assembly of claim 8, wherein each plunger housing defines an individual conduit fluidly coupling a respective plunger housing of the plurality of plunger housings to the common air channel.

12. The manifold assembly of claim 11, wherein the conduit is configured for coupling with a solenoid valve such that the solenoid valve controls a flow through the conduit.

13. The manifold assembly of claim 8, wherein the plunger arm receiving portion further comprises a second plunger arm receiving portion that defines a portion of the common fluid channel.

14. The manifold assembly of claim 8, further comprising the elongated plunger for each of the plunger housings and surrounded by the plunger housing, each plunger actuable using the common air channel and having an elongated portion arranged within the common fluid channel.

15. The manifold assembly of claim 14, wherein
- the plunger further comprises a plunger head connected to the elongated portion and fluidically coupleable with the common air channel, and
- the plunger is responsive to changes in pressure within a respective plunger housing of the plunger housings that are induced by air within the common air channel.

* * * * *